(12) United States Patent
Whiteman

(10) Patent No.: US 8,883,273 B2
(45) Date of Patent: Nov. 11, 2014

(54) PHOTONIC CRYSTAL SECURITY DEVICE

(75) Inventor: Robert Whiteman, Berkshire (GB)

(73) Assignee: De La Rue International Limited, Hampshire (GB)

(*) Notice: Subject to any disclaimer, the term of this patent is extended or adjusted under 35 U.S.C. 154(b) by 1050 days.

(21) Appl. No.: 12/309,535

(22) PCT Filed: Aug. 10, 2007

(86) PCT No.: PCT/GB2007/003064
§ 371 (c)(1),
(2), (4) Date: Feb. 4, 2009

(87) PCT Pub. No.: WO2008/017869
PCT Pub. Date: Feb. 14, 2008

(65) Prior Publication Data
US 2010/0001509 A1 Jan. 7, 2010

(30) Foreign Application Priority Data
Aug. 10, 2006 (GB) .................................. 0615919.8

(51) Int. Cl.
G02B 1/00 (2006.01)
B41M 3/14 (2006.01)
B42D 15/00 (2006.01)
B82Y 20/00 (2011.01)

(52) U.S. Cl.
CPC ............. *B42D 15/0026* (2013.01); *B82Y 20/00* (2013.01); *G02B 1/005* (2013.01); *B41M 3/148* (2013.01); *B42D 2033/26* (2013.01); *B42D 2035/24* (2013.01)
USPC ............ 428/29; 283/91; 428/195.1; 428/209; 428/323

(58) Field of Classification Search
CPC ........ G02B 1/005; B82Y 20/00; B41M 3/148
USPC .................... 283/91; 428/29, 195.1, 209, 323
See application file for complete search history.

(56) References Cited

U.S. PATENT DOCUMENTS

| 1,996,539 | A | | 4/1935 | Dufay |
| 4,186,943 | A | | 2/1980 | Lee |
| 5,639,126 | A | * | 6/1997 | Dames et al. .................... 283/83 |

(Continued)

FOREIGN PATENT DOCUMENTS

| CA | 2032587 | 7/1996 |
| CA | 2076532 | 12/1998 |

(Continued)

OTHER PUBLICATIONS

Pursiainen et al., "Nanoparticle-tuned structural color from polymer opals," *Optics Express*, vol. 15, No. 15, Jul. 23, 2007, pp. 9553-9561.

(Continued)

*Primary Examiner* — Bruce H Hess
(74) *Attorney, Agent, or Firm* — Oliff PLC

(57) ABSTRACT

An optically variable security device comprises a photonic crystal of which incident light received by the crystal is selectively reflected or transmitted by the crystal to generate a first optically variable effect observable over a first set of directions. Incident light received by the crystal is also selectively reflected or transmitted by the crystal to generate an optical effect observable over a second set of directions that is different from the first set.

51 Claims, 16 Drawing Sheets

(56) References Cited

U.S. PATENT DOCUMENTS

| | | | |
|---|---|---|---|
| 5,783,275 | A | 7/1998 | Mück et al. |
| 5,898,004 | A | 4/1999 | Asher et al. |
| 6,036,230 | A | 3/2000 | Färber |
| 6,337,131 | B1 | 1/2002 | Rupaner et al. |
| 6,343,745 | B1 * | 2/2002 | Bohm et al. ............... 235/493 |
| 6,946,086 | B2 | 9/2005 | Foulger et al. |
| 7,040,663 | B1 | 5/2006 | Plaschka et al. |
| 7,068,431 | B2 | 6/2006 | Fukshima et al. |
| 2003/0031438 | A1 * | 2/2003 | Kambe et al. ............... 385/122 |
| 2003/0179364 | A1 * | 9/2003 | Steenblik et al. ............... 356/71 |
| 2003/0206694 | A1 * | 11/2003 | Babin et al. ............... 385/31 |
| 2004/0131799 | A1 | 7/2004 | Arsenault et al. |
| 2004/0170352 | A1 | 9/2004 | Summers et al. |
| 2004/0228575 | A1 | 11/2004 | Kim et al. |
| 2004/0253443 | A1 | 12/2004 | Anselmann et al. |
| 2005/0029800 | A1 | 2/2005 | Disano et al. |
| 2005/0224203 | A1 | 10/2005 | Boehm et al. |
| 2005/0228072 | A1 | 10/2005 | Winkler et al. |

FOREIGN PATENT DOCUMENTS

| | | |
|---|---|---|
| CA | 2163528 | 12/1998 |
| DE | 102 28 228 A1 | 4/2003 |
| EP | 0 059 056 A1 | 9/1982 |
| EP | 0 435 029 A2 | 7/1991 |
| EP | 0 516 790 A1 | 12/1992 |
| EP | 0 723 501 A1 | 4/1995 |
| EP | 0 724 519 A1 | 4/1995 |
| EP | 0 860 298 A2 | 8/1998 |
| EP | 1 141 480 A1 | 10/2001 |
| EP | 1 156 934 A1 | 11/2001 |
| WO | WO 83/00659 A1 | 3/1983 |
| WO | WO 90/02658 A1 | 3/1990 |
| WO | WO 97/19821 A1 | 6/1997 |
| WO | WO 98/20382 A1 | 5/1998 |
| WO | WO 98/25236 A1 | 6/1998 |
| WO | WO 99/28852 A1 | 6/1999 |
| WO | WO 03/054297 A2 | 7/2003 |
| WO | WO 03/061980 A1 | 7/2003 |
| WO | WO 03/062900 A1 | 7/2003 |
| WO | WO 03/091952 A2 | 11/2003 |
| WO | WO 03/091953 A2 | 11/2003 |
| WO | WO 03/095188 A2 | 11/2003 |
| WO | WO 2005/080089 A1 | 9/2005 |
| WO | WO 2006/018094 A1 | 2/2006 |
| WO | WO 2007/079453 A2 | 7/2007 |

OTHER PUBLICATIONS

Arsenault et al., "From colour fingerprinting to the control of photoluminescence in elastic photonic crystals," *Nature Materials*, vol. 5, Mar. 2006, pp. 179-184.

Dr. G. Bastian, "Photonische Kristallsensoren", Workshop "Organische Materialien in der optoelektronischen Anwendung", Mar. 10, 2006 (with translation).

Jul. 6, 2011 Office Action issued in U.S. Appl. No. 12/309,534.

Ruhl et al., "Artificial opals prepared by melt compression," Polymer, Sep. 24, 2003, pp. 7625-7634, vol. 44.

Office Action issued in U.S. Appl. No. 12/309,534; mailed May 10, 2012.

Mar. 5, 2013 Office Action issued in U.S. Appl. No. 12/309,534.

U.S. Office Action dated May 15, 2014 from U.S. Appl. No. 12/309,534.

* cited by examiner

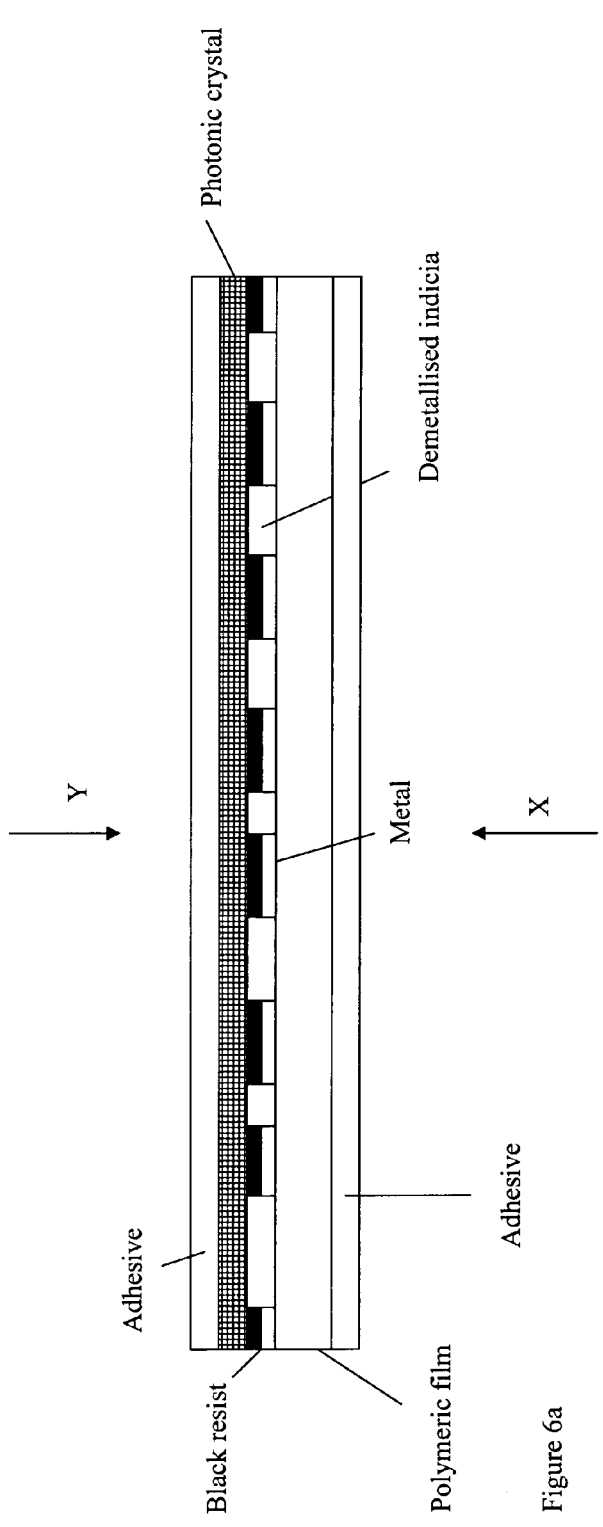
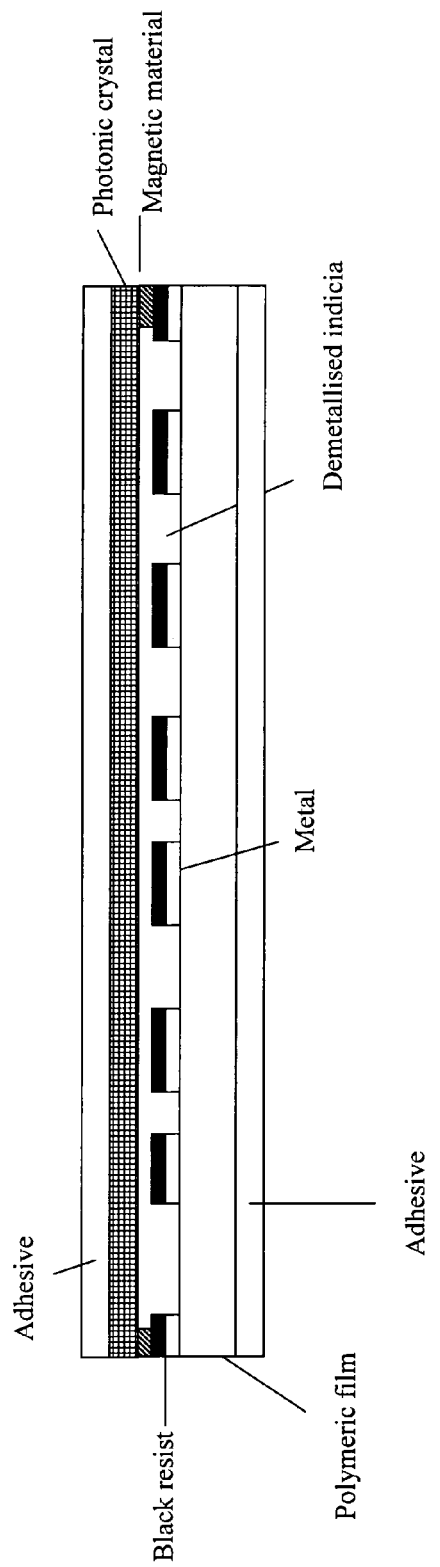
Figure 6a
Figure 6b

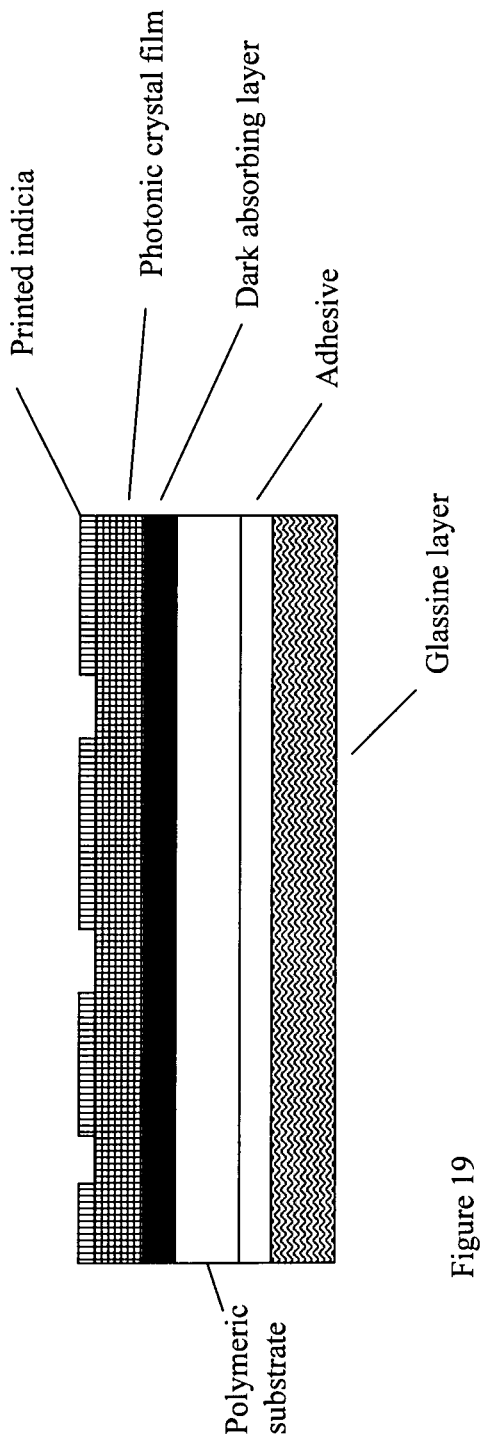
Figure 19
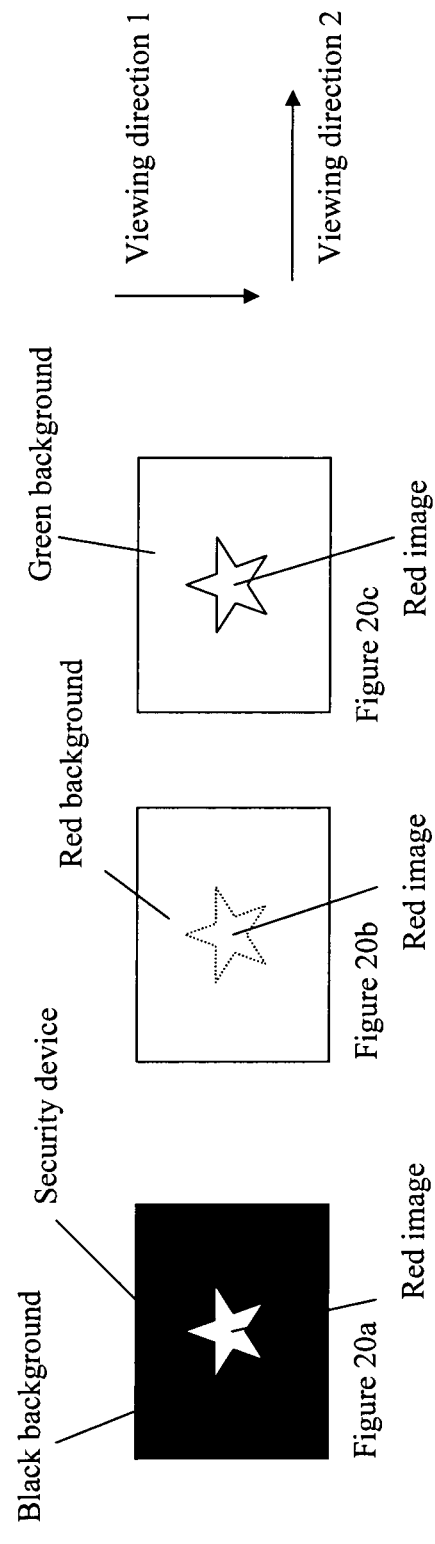

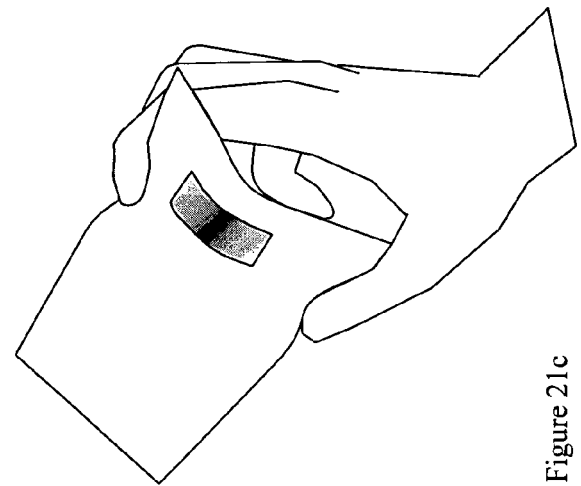
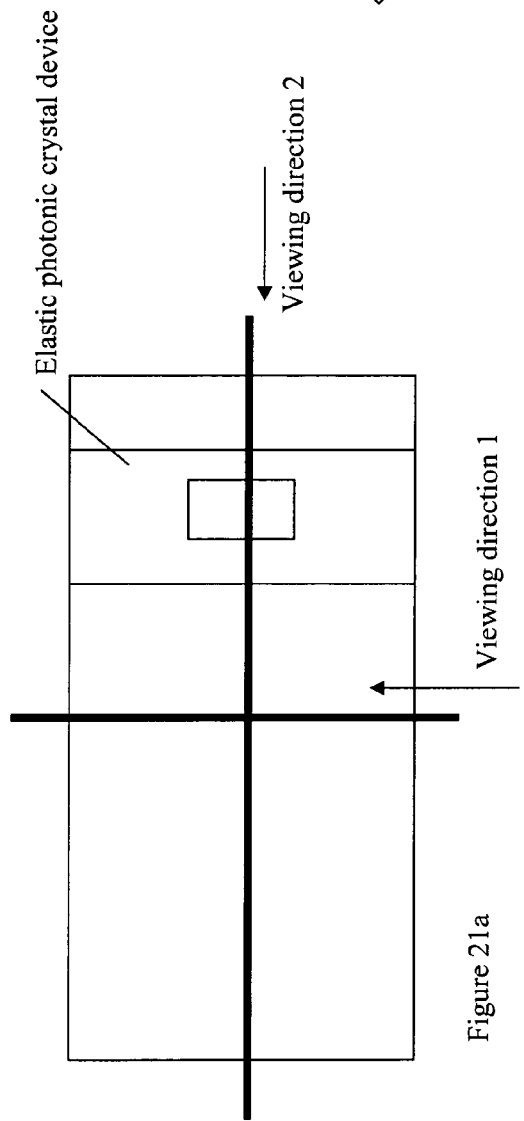
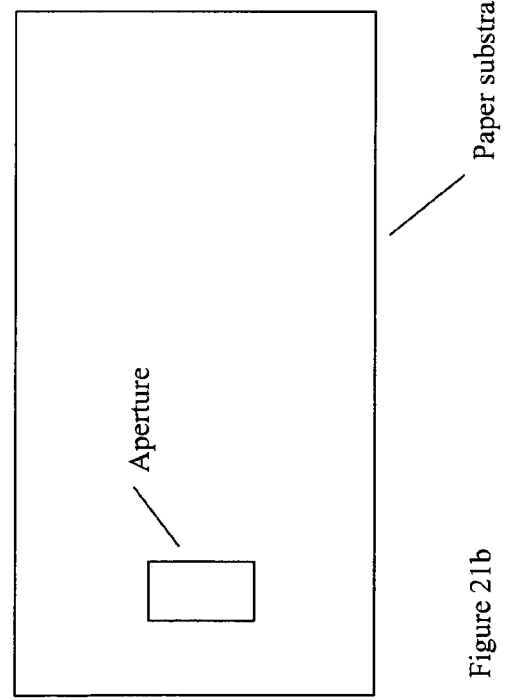
Figure 21c
Figure 21a
Figure 21b

PHOTONIC CRYSTAL SECURITY DEVICE

The present invention relates to improvements in security devices that can be used in varying shapes and sizes for various authenticating or security applications.

Security documents such as banknotes now frequently carry optically variable devices that exhibit an angularly dependent coloured reflection. This has been motivated by the progress in the fields of computer-based desktop publishing and scanning, which renders conventional security print technologies such as intaglio and offset printing more prone to attempts to replicate or mimic. It is well known in the prior art to use liquid crystal materials or thin film interference structures to generate such angularly dependent coloured reflection. Examples of liquid crystal based security devices are described in EP0435029, WO03061980, and EP1156934 and examples of security devices utilising thin film interference structures are described in U.S. Pat. No. 4,186,943 and US20050029800.

The planar nature of liquid crystal films and thin film interference structures results in the observed angularly dependent coloured reflection exhibiting limited spatial variation for example a simple red to green colour change on tilting the security device away from normal incidence.

Photonic crystals are structured optical materials in which the refractive index varies periodically in two or preferably three dimensions. These materials exhibit a range of interesting optical effects when subject to electromagnetic radiation of a wavelength comparable to the spatial modulation of the refractive index. Bragg reflection may occur over a range of wavelengths that depend on the direction of incidence/propagation and the periodicity of refractive index variation. This gives rise to photonic 'energy gaps' that are analogous to the electronic band gaps in semiconductors. Typically, electromagnetic waves within a certain frequency range cannot propagate in particular directions within the crystal, and incident electromagnetic radiation at these wavelengths is consequently reflected. It is the presence of such partial photonic band gaps that gives rise to the shimmering colours observed in opal gemstones.

In general there is a complex dependence on the wavelength, direction of propagation and polarisation that dictates which electromagnetic waves may propagate within the photonic crystal and those that are otherwise reflected. However, if the modulation in refractive index is sufficiently strong, propagation of certain frequencies can be forbidden for any crystalline direction, and a complete photonic band gap arises. In this case light is prevented from propagating within the crystal in any direction, and the material acts as an ideal reflector such that all light of a wavelength within the band gap range is perfectly reflected irrespective of the incident direction.

There exists two well-documented methods of fabricating structures with the necessary highly ordered variation in refractive index—microfabrication and self-assembly. Due to the complexity of microfabrication considerable effort has been devoted to investigating self-assembling systems comprised of submicron three-dimensional arrays of dielectric spheres. Such photonic crystals are formed by allowing a colloidal suspension of identically sized spheres to settle slowly under the influence of gravity or by the application of an external force such that spheres naturally order. One well-known example is the fabrication of synthetic opal structures where uniformly sized sub-micron silica spheres are organised through a sedimentation process into a face-centred cubic crystal structure.

Further enhancements to this technique have been developed such that the synthetic opal acts as a precursor or template to further customise the structure. It has been shown that it is possible to use such systems as templates to realise materials known as inverted opals. Here, the voids between the silica spheres are first filled with materials of a high refractive index, and the silica is then dissolved by chemical means to give a material that consists of air spheres separated by a uniform matrix of the high refractive index material.

The use of photonic crystals to generate angular dependent coloured reflection is described in WO03062900 and US20050228072. The optical properties of photonic crystals can be engineered and varied to a greater extent than the optical properties of planar liquid crystal and thin film interference devices. Firstly the angular and wavelength dependence of the reflected light can be more easily controlled by varying the crystal lattice structure by either simply adjusting the sphere size, or the sphere separation. Similarly, selected allowed and disallowed reflections/transmissions may be engineered or enhanced by introducing structural defects into the lattice or by introducing nanoparticles into the structure. This in principle gives freedom to modify and engineer the band structure and hence the wavelength and spatial dependence of the reflectivity.

The use of photonic crystals in security devices has been limited and in the prior art their use is limited to a simple angular dependent coloured reflection the authenticator observes by tilting the device. There is also no teaching in the prior art on how to incorporate such devices into security documents such that the additional optical effects possible from photonic crystals, compared to other well known dichroic materials, can be used to validate the document. The object of the current invention is to improve the security of the devices described in the prior art.

In accordance with the present invention we provide an optically variable security device comprising a photonic crystal for which incident light received by the crystal is selectively reflected or transmitted by the crystal to generate a first optically variable effect observable over a first set of directions and incident light received by the crystal is selectively reflected or transmitted by the crystal to generate an optical effect, different from the first optically variable effect, observable over a second set of directions that is different from the first set.

The optical effect may produce a non-optically variable effect, such as reflection of the incident light at all wavelengths. Typically however, the optical effect generated is a second optically variable effect that is different from the first.

Preferably, the optically variable security device therefore comprises a photonic crystal that exhibits at least one angular dependent coloured reflection observable over a first set of directions and a second different angular dependent coloured reflection observable over a second set of directions that is different from the first set. The first and/or second sets of directions may lie substantially in respective planes.

The present invention therefore provides a two-directional optical effect. Preferably therefore, the first and second optically variable effects are dependent upon the crystal orientation with respect to the incident light. Furthermore, typically the optically variable effects are a function of the viewing angle with respect to the crystal.

Therefore, the invention provides an enhanced security effect by providing two different effects when viewed from different positions as the security device is rotated. Preferably each effect is visible to a human observer although it may in addition or alternatively be machine-readable.

Reflected light in the context of the present invention includes both specularly reflected light and scattered light.

Photonic crystal materials suitable for use with the invention are those where the exhibited full or partial photonic bandgap does not have rotational symmetry about the normal to its surface. For example, the spatial variation of the bandgap associated with light incident in the x-z plane may be different to that in the y-z plane. As a result, the colour of the reflected light at an arbitrary azimuthal angle in the x-z plane will not in general be the same as that for reflected light at the same azimuthal angle in the y-z plane. Thus for an arbitrary azimuthal angle the surface will appear to change colour on rotation. Preferably the full or partial photonic band gap may also be a function of the azimuthal angle in one or both planes, such that one or both planes also exhibit an angular dependent colour shift.

One method of achieving this effect is to provide a photonic crystal formed from spheres of a first material and a matrix of the second material wherein each material has a different respective refractive index, the relative arrangement of the spheres and matrix providing the different effects in the respective sets of directions.

The structural parameters of the photonic crystal may be arranged to be different in different regions of the crystal, so as to effectively generate multiple crystals with different optical properties. Furthermore, the "crystal" may comprise a plurality of individual crystals.

Various types of crystals may be used to achieve the present invention, and it should be noted that the term "photonic crystal" is intended to include quasi-crystals that exhibit this effect, as well as more conventional ordered "non-quasi" photonic crystals.

It is also envisaged that the structural parameters of the photonic crystal may be arranged to be different in different regions of the crystal, so as to effectively generate multiple crystals with different optical properties. Furthermore, the "crystal" may comprise a plurality of individual crystals.

The light may comprise visible and/or non-visible light, therefore including for example ultraviolet and infra-red light. Broad or narrow wavelength bands may be used. Likewise, the photonic crystal may be arranged to selectively reflect light in the non-visible part of the spectrum (including ultra-violet and infra-red). When the light is produced by a white light (broad wavelength band) source, preferably the first and second optical variable effects are colour effects. The first optically variable effect is therefore preferably a first angularly dependent colour effect and the second optically variable effect is preferably a second angularly dependent colour effect, that is different from the first. In this way, the colour observed is a different function of the viewing angle when viewing in the two respective directions.

A difference is therefore observed in the angular dependent coloured reflection when the device is tilted along the different specified crystallographic directions. For example, the photonic crystal can be oriented such that one colourshift is viewed when the sample is tilted around an axis parallel to a long side of a rectangular document in which the device is contained, and a second colourshift is observed when the sample is rotated and tilted around an axis parallel to a short side of the document.

It will be appreciated that the two sets of directions may not be orthogonal. Whilst the first and second effects are preferably observed as reflective effects, transmissive effects are also contemplated.

The photonic crystal may be provided in a number of forms, for example as a self-supporting layer. Alternatively, it may be supported by a substrate or carrier layer to which it is mounted directly or indirectly (through one or more further layers). The substrate or the carrier layer may take the form of a polymeric layer.

The security device may also comprise one or more further adhesive layers, for example, for bonding the device to a further device and/or security document. Typically one or more of such adhesive layers are provided upon an outer surface of the device.

A scattering layer may also be provided so as to cause scattering of the reflected light from the photonic crystal.

The optically variable security device may further comprise an optically absorbent material provided as one or more layers applied to the device. Such a layer may be provided upon the photonic crystal or indeed the material may be formed within the crystal structure itself. A combination of these is also contemplated. The inclusion of such an absorbent material can be used to enhance the optical effect to an observer, or used to modify the optical effect by the use of for example absorbent materials that are selectively absorbent at the wavelengths of light used. In some examples dyes or inks are used for this purpose.

The optical properties may also be additionally or alternatively further modified or enhanced by the use of nanoparticles positioned within the crystal structure, preferably at interstitial sites. The nanoparticles may be distributed substantially uniformly through the crystal such that each part of the crystal exhibits substantially the same optical effect. Alternatively the nanoparticles may be distributed inhomogeneously through the crystal such that different parts of the crystal exhibit a substantially different optical effect. Thus the nanoparticles may be distributed according to a concentration gradient. The nanoparticles may also be distributed in a number of regions having different concentrations.

The optically variable security device may further comprise a metallised layer. Preferably such as layer is selectively demetallised at a number of locations. In addition the device may further comprise a layer of resist upon the metallised layer. The metallised layer and/or the layer of resist is preferably arranged as indicia. Such layers with or without indicia may be visible from the same side of the photonic crystal that receives the light, or from the reverse side. Transmissive viewing of the layers is also contemplated.

It is also preferred that the device is arranged to be machine-readable. This may be achieved in a number of ways. For example at least one layer of the device (optionally as a separate layer) or the photonic crystal itself may further comprise machine-readable material. Preferably the machine-readable material is a magnetic material, such as magnetite. The machine-readable material may be responsive to an external stimulus. Furthermore, when the machine-readable material is formed into a layer, this layer may be transparent.

The optically variable security device may be used in many different applications, for example by attachment to objects of value. Preferably, the security devices are adhered to or substantially contained within a security document. Such security documents include banknotes, cheques, passports, identity cards, certificates of authenticity, fiscal stamps and other documents for securing value or personal identity.

The security device may therefore be attached to a surface of such a document or it may be embedded within the document so as to provide crystal surfaces for receiving incident light on one or each of opposing faces of the document. The security device may take various different forms for use with security documents, these including a security thread, a security fibre, a security patch, a security strip, a security stripe or a security foil as non-limiting examples.

Polymeric based photonic crystal materials are particularly suitable for the current invention and would typically comprise polymeric materials for both the matrix and the spheres. Typical examples of polymeric photonic crystals suitable for the current invention are described in US20040131799, US20050228072, US20040253443 and U.S. Pat. No. 6,337,131. The crystal may be formed from spheres of the first material and a matrix of a second material wherein each material has a different respective refractive index.

Materials suitable for forming the spheres are preferably single polymer or copolymer materials. Typical examples include both polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters, polyamides, polycarbonates, polyureas and polyurethanes, but also amino and phenolic resins, such as, for example, melamine-formaldehyde, urea-formaldehyde and phenol-formaldehyde condensates, are suitable.

Materials suitable for forming the matrix include addition polymers and copolymers of polymerizable unsaturated monomers and also of the polycondensates and copolycondensates of monomers having two or more reactive groups, e.g., high molecular weight aliphatic, aliphatic-aromatic or wholly aromatic polyesters and polyamides, but also of the amino and phenolic resins, such as melamine-formaldehyde, urea-formaldehyde and phenol-formaldehyde condensates.

Non-polymeric materials are also envisaged for the spheres and the matrix and they may be inorganic or metallic or a hybrid composite.

Preferably the photonic crystal material for use in the current invention is in the form of a film. Production methods for forming polymeric films of photonic crystal materials are known in the art. For example films can be made using standard polymer continuous processing techniques such as rolling, calendaring, film blowing or flat-film extrusion as detailed in US20050228072. In this process the alignment of the spheres occurs under the mechanical force applied by the film forming process. Once the film is formed the matrix is cross-linked to fix the orientation of the spheres. Alternatively a film of photonic crystal material can be made by applying a coating composition comprising the spheres and matrix to a carrier film as described in U.S. Pat. No. 6,337,131. Once the coating composition has been applied any dispersing or diluting material is removed and the spheres orientate via a settling process following which the matrix is cross-linked to fix the orientation of spheres.

Alternatively the photonic crystal material can be used in a powder or pigmented form. The pigments are obtained by forming a film on a carrier layer, detaching the film and grinding it up into a pigment or powder.

The security device could be arranged either wholly on the surface of the document, as in the case of a stripe or patch, or may be visible only partly on the surface of the document in the form of a windowed security thread. The photonic crystal material is preferably incorporated into the device structure as a film but alternatively it may be incorporated as a pigmented coating.

The security device may include other additional security features or the device may be overlaid over an additional security feature, one example of which is the selectively demetallised layer discussed above, in order to provide enhanced security. The security device may also be supported upon a transparent layer, for example to allow the surface contacted by the transparent layer to receive or transmit light.

Security threads are now present in many of the world's currencies as well as vouchers, passports, travelers' cheques and other documents. In many cases the thread is provided in a partially embedded or windowed fashion where the thread appears to weave in and out of the paper. One method for producing paper with so-called windowed threads can be found in EP0059056. EP0860298 and WO03095188 describe different approaches for the embedding of wider partially exposed threads into a paper substrate. Wide threads, typically with a width of 2-6 mm, are particularly useful as the additional exposed area allows for better use of optically variable devices such as the current invention.

The device could be incorporated into the document such that regions of the device are viewable from both sides of the document. Techniques are known in the art for forming transparent regions in both paper and polymer substrates. For example, WO 8300659 describes a polymer banknote formed from a transparent substrate comprising an opacifying coating on both sides of the substrate. The opacifying coating is omitted in localised regions on both sides of the substrate to form a transparent region.

Methods for incorporating a security device such that it is viewable from both sides of a paper document are described in EP1141480 and WO03054297. In the method described in EP1141480 one side of the device is wholly exposed at one surface of the document in which it is partially embedded, and partially exposed in windows at the other surface of the substrate.

In the case of a stripe or patch the photonic crystal film is preferably prefabricated on a carrier substrate and transferred to the substrate in a subsequent working step. The photonic crystal film can be applied to the document using an adhesive layer. The adhesive layer is applied either to the photonic crystal film or the surface of the secure document to which the device is to be applied. After transfer the carrier strip can be removed leaving the photonic crystal film device as the exposed layer or alternatively the carrier layer can remain as part of the structure acting as an outer protective layer.

Following the application of the photonic crystal device the document, such as a banknote, undergoes further standard security printing processes including one or more of the following; wet or dry lithographic printing, intaglio printing, letterpress printing, flexographic printing, screen-printing, and/or gravure printing. In a preferred example and to increase the effectiveness of the security device against counterfeiting the design of the security device should be linked to the document it is protecting by content and registration to the designs and identifying information provided on the document.

Furthermore the photonic crystal device may be customised by overprinting or embossing either before or after it is incorporated into the security document. The embossing may comprise a coarse non-diffractive embossing or a diffractive embossing. The device may be arranged to produce a latent image which is selectively visible according to the viewing angle. The surface of the photonic crystal may be directly embossed to produce raised structures which can be used to form a latent image. Furthermore the device may be arranged to comprise a hologram, optionally using an embossed structure on the photonic crystal surface, or by providing a diffractive structure in a further metallic layer which may partially overlay the crystal for example.

In some cases the photonic crystal may exhibit a further optical effect in response to an external stimulus. Typically the further optical effect is an optically variable effect. The stimulus may take a number of forms, including a mechanical, thermal, chemical, electrical, magnetic, electromagnetic or sonic stimulus, or indeed a combination of such stimuli. Whilst such stimuli may have an irreversible effect, preferably the effect is reversible. An elastic photonic crystal can be used to achieve such an effect.

Some examples of the present invention with now be described with reference to the accompanying drawings, in which:—

FIG. 6a shows a security device according to a fifth example having demetallised characters;

FIG. 6b shows a machine-readable sixth example including magnetic material;

Figure 12:
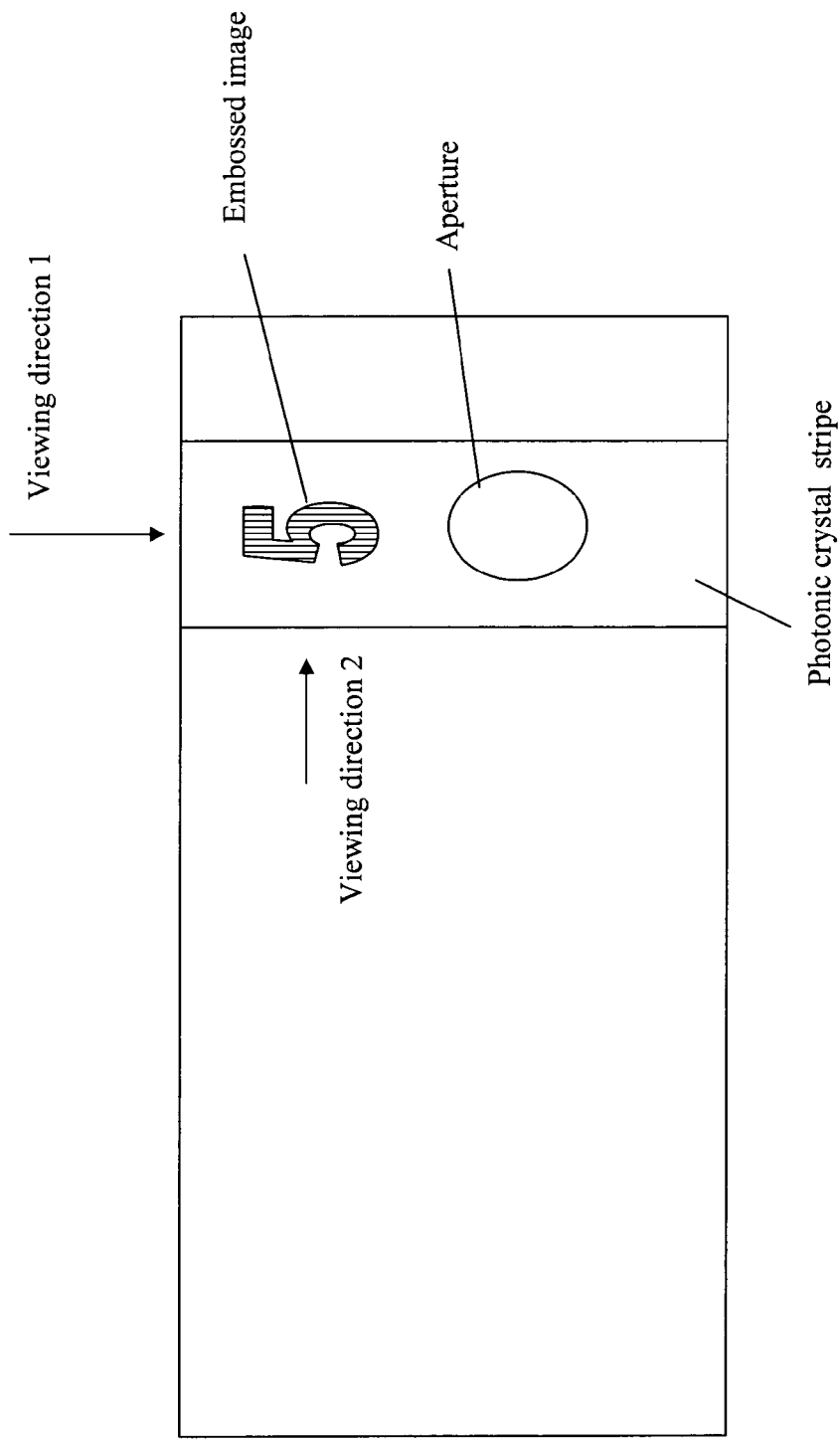
Figure 13:
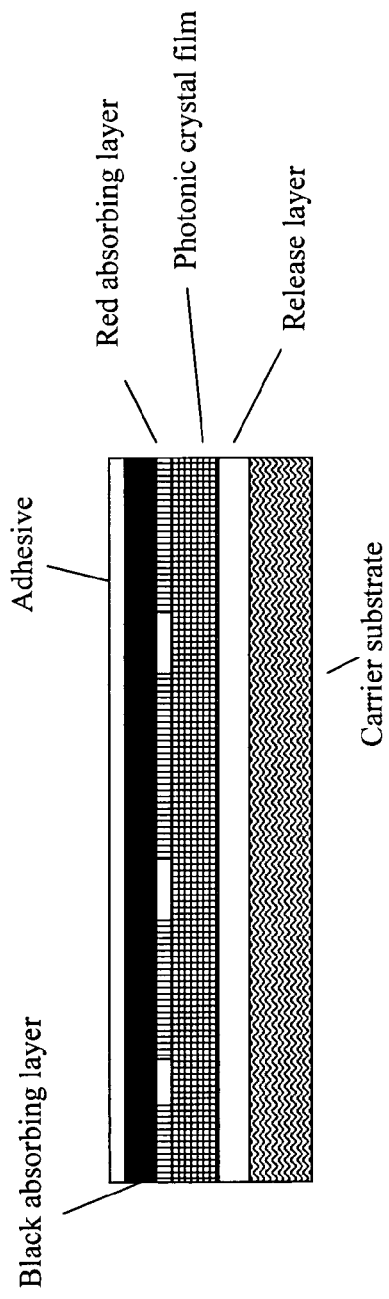
Figure 14:
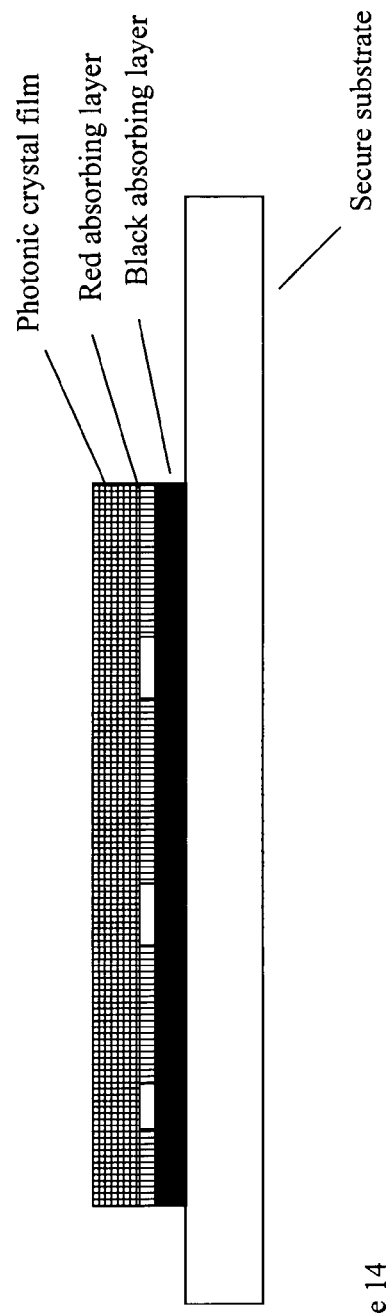
Figure 15:
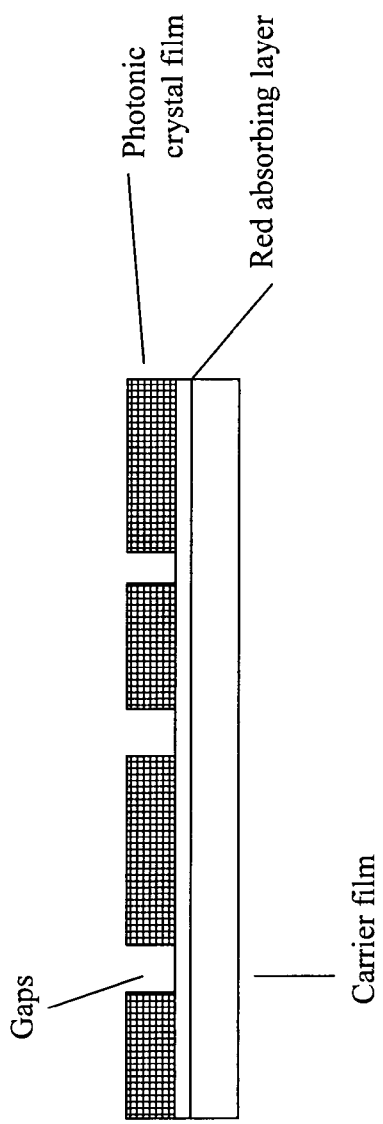
Figure 16:
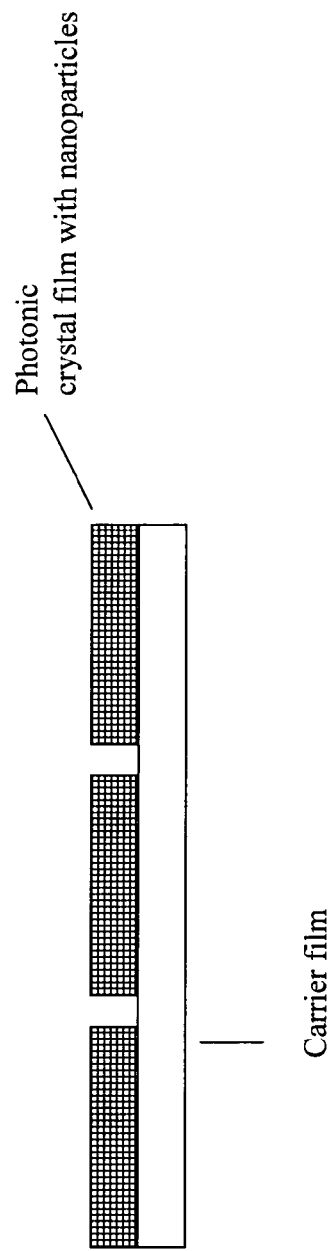
Figure 17:
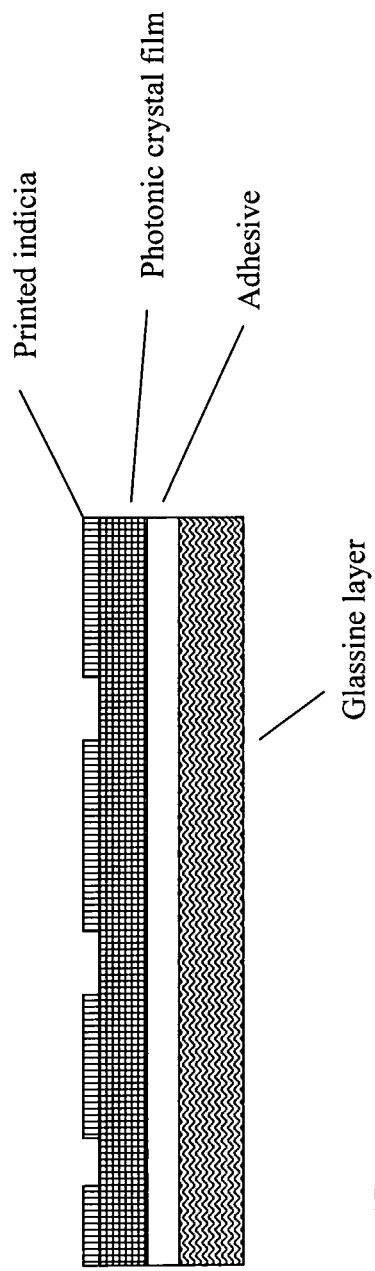
Figure 18:
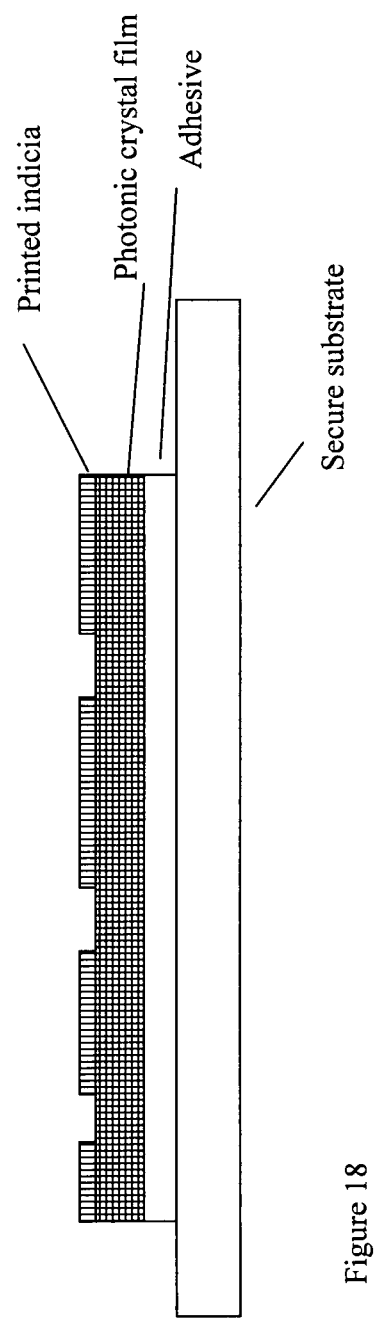

FIGS. 11a,b,c shows an eleventh example security device when viewed from three different directions (11a, 11b, 11c respectively);

FIG. 12 shows a twelfth example security device which is further embossed;

FIG. 13 shows a thirteenth example security device having red and black absorbing layers;

FIG. 14 shows the thirteenth example security device applied to a document;

FIG. 15 shows a fourteenth example security device having gaps in the photonic crystal and having an absorbing layer;

FIG. 16 shows a fifteenth example security device containing nanoparticles;

FIG. 17 shows a sixteenth example security device for use as a label;

FIG. 18 shows the sixteenth example device attached to a substrate;

FIG. 19 shows a seventeenth example, analogous to the sixteenth;

FIGS. 20a,b,c show the seventeenth example security device when viewed from three different directions (20a, 20b, 20c respectively);

FIGS. 21a,21b show front and rear views respectively of an eighteenth example security device having an elastic photonic crystal; and, FIG. 21c is a schematic view of the eighteenth example being deformed in the hand of a user.

Figure 1:
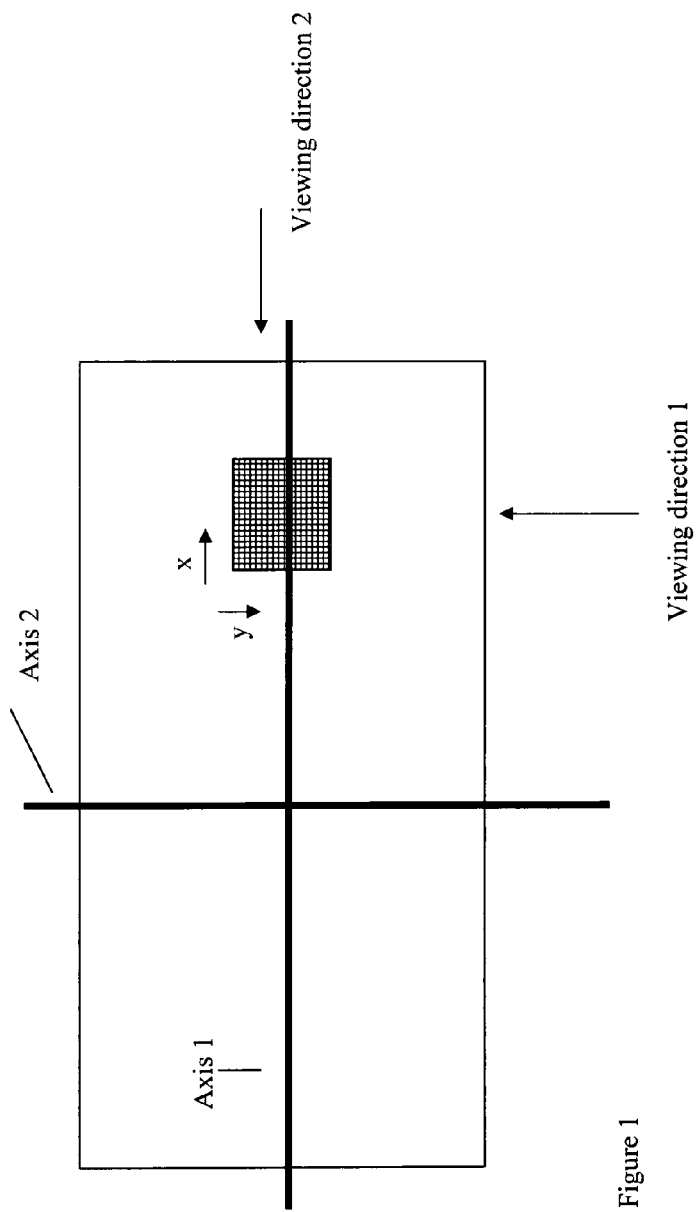
FIG. 1 illustrates the operation of the photonic crystal effects.
Figure 2:
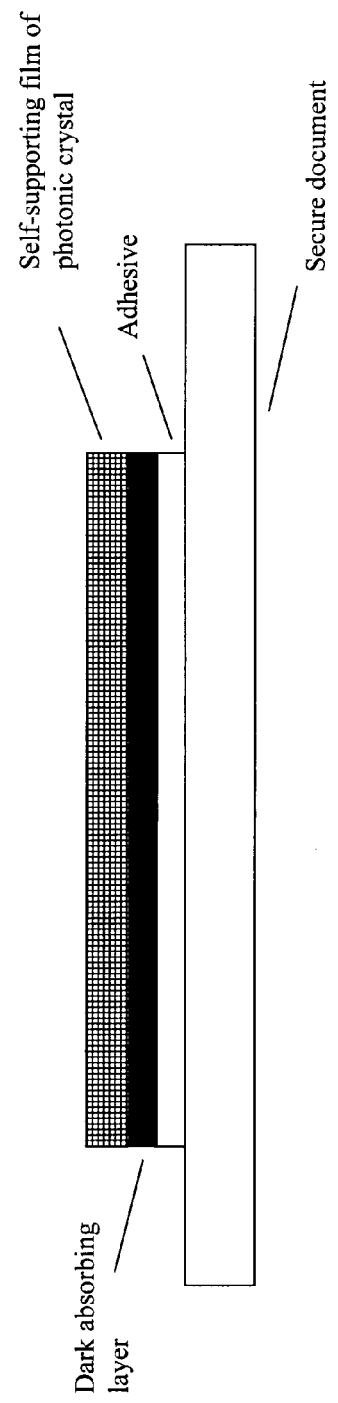
FIG. 2 shows the incorporation of a photonic crystal onto a carrier layer according to a first example.

FIG. 1 shows the security device of the current invention incorporated into a security document, as a surface applied patch. FIG. 2 shows a cross-sectional view of the patch on the document in FIG. 1.

The device comprises a self-supporting photonic crystal film, onto which is applied a dark absorbing layer. An adhesive layer is applied to the outer surface of the device on the dark absorbing layer to adhere it to the secure document. Although the detailed physics of photonic crystals is rather complex, the principle can be summarised by regarding the photonic crystal exhibiting a different partial photonic band gap for light propagating in direction x compared to light propagating in direction y. The variation in the partial photonic band gap in the x-z plane and y-z plane may be a result of the symmetry of the photonic crystal structure, i.e. the packing arrangement of the spheres, or a result of the presence of inclusions or defects within the photonic crystal structure.

When the device in FIG. 2 is viewed in reflection along viewing direction 1 a highly contrasting colour shift effect is observed as the device is tilted along axis 1. On rotating the device about a normal to the device plane and viewing along viewing direction 2, the colour of the device will change and furthermore will exhibit a different colourshift when tilted along axis 2 compared to when titled along axis 1 for the same angular range. For example the colourshift can be from red, when viewed at a relatively high angle of incidence, for example 70°, to the plane of substrate, to green when viewed at a more oblique angle of incidence, for example 45°, to the plane of the substrate. On rotating the security document and viewing along viewing direction 2 a different highly contrasting colourshift is observed, for the same angular range, as the device is tilted along axis 2 compared to along axis 1. For example the colourshift can be from green, when viewed at 70° to the plane of substrate, to blue when viewed at 45° of incidence to the plane of the substrate.

Figure 3:
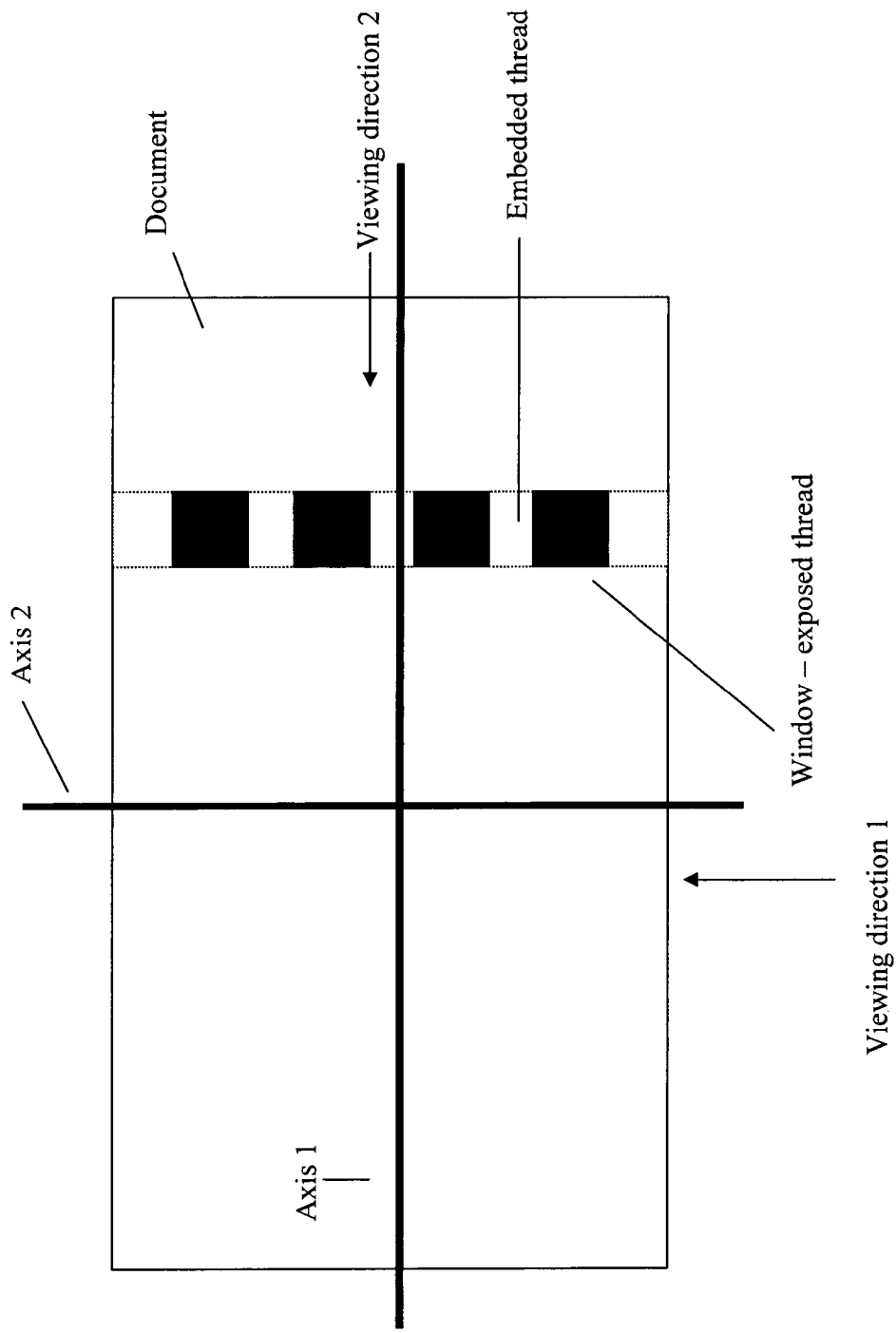
FIG. 3 shows the security device as a second example incorporated into a security document.
Figure 4:
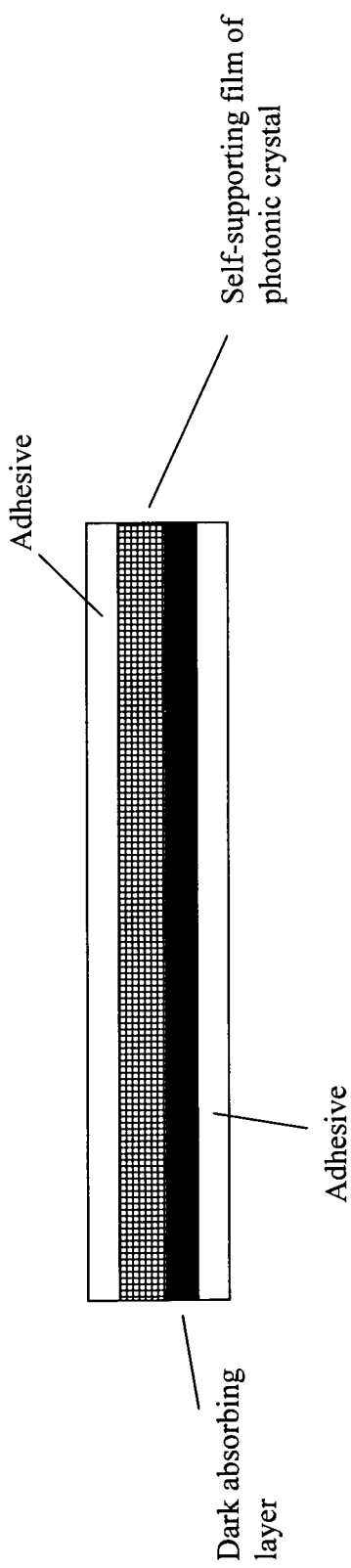
FIG. 4 shows a third example of a security device for use in a windowed security thread.

FIG. 3 shows the security device of the current invention incorporated into a security document as a windowed thread with windows of exposed thread and areas of embedded thread. FIG. 4 shows a cross-sectional view of one example of the current invention suitable for application as a windowed security thread. The device comprises a self-supporting photonic crystal film, onto which is applied a dark absorbing layer. An adhesive layer may be applied to the outer surfaces of the device to improve adherence to the secure document.

When the device in FIG. 3 is viewed in reflection under ambient conditions, a highly contrasting colourshift effect is observed in the window regions from the photonic crystal layer as the device is tilted along a first direction. For example viewing along the long axis of the security thread (viewing direction 1) the colourshift can be from red, when viewed at one angle of incidence, for example 70°, to green when viewed at a more oblique angle of incidence, for example 45° to the plane of the substrate, the tilt being in a plane containing the first viewing direction, i.e. tilted around axis 2. If the device is viewed at 70° to the plane of the substrate and rotated by 90° such that it is now being viewed along the short axis of the security thread (viewing direction 2) a colour change will be observed on rotation for example red to green. If viewing direction 2 is maintained a second different angular dependent colourshift is observed, for example green to blue, as the device is tilted to a more oblique angle of incidence, for example 45° to the plane of the substrate, the tilt being in a plane containing the second viewing direction, i.e. tilted around axis 1.

Figure 5:
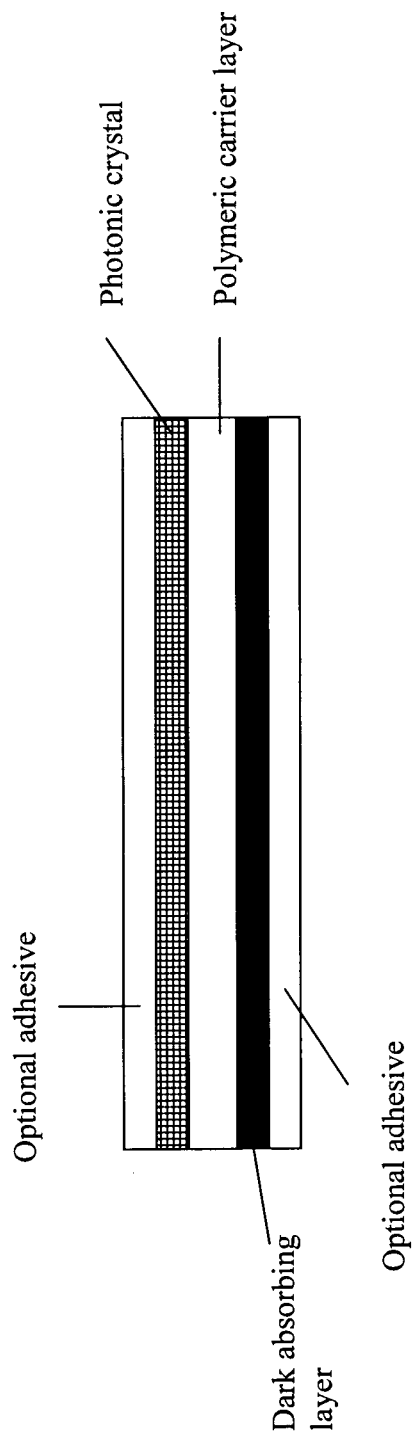
FIG. 5 shows a security device according to a fourth example having a polymeric carrier layer.

In an alternative structure to that shown in FIG. 4, and illustrated in FIG. 5, the security device comprises a polymeric carrier substrate, for example Polyethylene Terephthalate (PET) or Bi-axially Oriented Polypropylene (BOPP), onto which is applied a dark absorbing layer. A layer of photonic crystal material is then applied to the opposite surface of the carrier film, or alternatively on to the dark absorbing layer. The photonic crystal layer may be formed directly onto the carrier substrate as a coated film or formed as a separate film and then laminated to the carrier substrate. The separate film can be formed as a self-supporting layer, using for example extrusion, or by coating onto a temporary carrier layer which is then discarded during the lamination process. This is particularly beneficial when the carrier substrate for the security thread comprises additional security features, such as magnetic layers and metallised layers comprising demetallised characters, which may not be suitable to be applied directly to the photonic crystal layer or which reduce the suitability of the carrier substrate to be used as a layer onto which the photonic crystal can be directly formed. An adhesive layer may be applied to the outer surfaces of the device to improve adherence to the secure document.

The fact that the security device in FIGS. 3, 4 and 5 is in the form of a windowed security thread is for illustration only and the photonic crystal could just as easily be employed as part of a surface applied security feature such as a stripe or a patch.

The examples of the current invention described in FIGS. 3 and 4 is viewed primarily in reflection and as such the optical effects of the photonic crystal material are best visualised against a dark non-selectively absorbing background. This can be achieved by placing an absorbing layer under the photonic crystal layer or by the introduction of absorbing particles into the photonic crystal materials. The absorbing particles should be significantly greater than the size of the spheres of the photonic lattice such that they do not cause a change in the lattice and consequently an undesirable change in the optical properties.

Whilst the use of a black, or very dark, substantially totally absorbing layer may give rise to the most strong colourshifts, other effects may be generated by the use of a partially absorbing layer of other colours or a combination of colours, giving rise to differing apparent colourshift colours. The absorbing layer of the current invention may comprise a pigmented ink or coating or alternatively a non-pigmented absorbing dye can be used.

The optical properties of the photonic crystal layer can be customised by modifying the characteristics of the photonic crystal lattice. The presence of a full or partial photonic band gap, resulting in the exclusion of certain wavelengths for specific directions of incidence/propagation, arises from the difference in refractive index between the matrix and the spheres forming the photonic crystal. Increasing the difference in refractive index between the spheres and the matrix increases the intensity of the observed colours and colourshifts and increases the number of directions of incidence propagation over which a specific wavelength is excluded.

Photonic crystals that can be more easily formed into films typically comprise polymeric materials for both the matrix and the spheres. The polymers for both the matrix and the spheres may be selected to maximise the refractive index difference. The refractive index difference should be at least 0.001, but more preferably greater than 0.01 and even more preferably greater than 0.1.

The optical properties of the photonic crystal layer can also be modified by changing the crystal structure, the crystal spacing or the size of the spheres. As a general guide, irrespective of the polymer type, the particle size of the spheres is preferably in the range 50-500 nm, and even more preferably in the range 100-500 nm, in order for the crystal to reflect light in the visible region of the electromagnetic spectrum.

It has been reported in the scientific literature, (see Optics Express, Vol. 15, No. 15, Page 9553-9561, 23 Jul. 2007), that nanoparticles can be introduced into the matrix of a photonic crystal in order to change or enhance the observed colours, colourshifts and tolerance on illumination angle. Preferably the size of the nanoparticles is selected such that they sit within the interstitial sites of the crystal lattice. The nanoparticles enhance resonant scattering events that occur within the photonic crystal giving rise to strong structural colours. For example the incorporation of carbon nanoparticles less than 50 nm in diameter into a system comprising polystyrene spheres with a sphere size of 200 nm in a polyethlyacrylate matrix, enhances the resonant scattering of the photonic crystal and dramatically alters the appearance of the photonic crystal film from one with a weakly coloured opalescene appearance to an intensely coloured green film. The use of the nanoparticles therefore provides a key advantage in that strongly intense colours are observed without the requirement for a separate absorbing layer or the incorporation of coarse absorbing particles. Furthermore there is an increased tolerance on illumination angle such that the observed colour is no longer as dependent on the position of the light source. In a second example magnetite nanoparticles can be incorporated to generate a magnetic machine-readable colourshifting film.

The concentration of the nanoparticles may be varied across the device. For example the nanoparticles could be introduced into localised regions or there could be a gradient in the number of nanoparticles across the device. This will result in a variation in the intensity of the colour and the associated colourshift across the device.

In one preferred embodiment the elastic photonic crystal film is produced by an extrusion process and the nanoparticles are added to the polymer reservoir prior to extrusion. In this case laterally spaced bands of nanoparticles can be achieved by providing a set of dividers in the polymer reservoir so that the additives are supplied through the extruder at corresponding lateral positions.

The particles may be made from material which is orientable in an electric, magnetic or electromagnetic field. In this way, alignment of the particles may be affected by selective application of that specified field to the elastic photonic crystal film prior to the final cross-linking step in the film production. Nano-photoluminescent particles such as quantum dots may be added to create a novel photoluminescence security feature. For example PbS nanoparticles can be added to produce luminescent films. It has been shown in the scientific literature (Nature Materials Volume 5 March 2006 Page 179) that embedding quantum dots in a photonic crystal results in suppression of luminescence if the emission frequency falls within the band gap of the photonic crystal. If the position of the photonic band gap varies according to the direction of the incident light relative to the crystal orientation, such that it overlaps or crosses through the photoluminescence peak of the embedded emitter suppression/enhancement of emission and dynamic modification of the luminescence lifetimes may occur creating an interactive security device where the fluorescence or phosphorescence is switched on or off by simply rotating the device relative to the incident radiation.

Security devices comprising photonic crystal materials are inherently machine-readable due to the wavelength selectivity of the photonic crystal materials. In further examples the machine readable-aspect of the current invention can be extended further by the introduction of detectable materials in the photonic crystal or by the introduction of separate machine-readable layers. Detectable materials that react to an external stimulus include but are not limited to fluorescent, phosphorescent, infrared absorbing, thermochromic, photochromic, magnetic, electrochromic, conductive and piezochromic materials.

In one preferred embodiment, the pigment in the separate absorbing layers is machine-readable, for example carbon black, to produce a machine-readable, conducting or IR absorbing layer. Alternatively it may be a magnetic material, such as magnetite, to produce a machine-readable magnetic layer.

It will be further understood by those skilled in the art that the security device of the current invention could be used in combination with existing approaches for the manufacture of security thread. Examples of suitable methods and constructions that can be used include, but are not limited to, those cited within WO03061980, EP0516790, WO9825236, and WO9928852.

FIG. 6a illustrates how the current invention can be combined with demetallised characters for application as a windowed security thread. The method requires a metallised film comprising a substantially clear polymeric film of PET or the like, which has an opaque layer of metal on a first side thereof. A suitable pre-metallised film is metallised MELINEX S film from DuPont of preferably 19 µm thickness. The metal layer is printed with a resist which contains a black or dark dye or pigment. Suitable resists include the dye BASE Neozapon X51 or the pigment (well dispersed) "Carbon Black 7" mixed into a material with both good adhesion to metal and caustic resistance.

The printed metallised film is then partially demetallised, according to a known demetallisation process using a caustic wash which removes the metal in the regions not printed with the resist. The remaining regions coated with resist provide a black layer which is visible when the demetallised film is viewed from its first side (along arrow Y) interspersed with clear regions. The shiny metal of the remaining parts of the metallic layer are only visible from an opposite side of the demetallised film (along arrow X). The resist may be printed in the form of the indicia such as words, numerals, patterns and the like; in which case the resulting indicia will be positively metallised, with the metal still covered by the dark or black resist. Alternatively the resist may be printed so as to form indicia negatively, in which case the resulting indicia will be provided by the demetallised regions. The indicia however formed, are clearly visible from both sides, especially in transmitted light, due to the contrast between the regions of the metal which have been removed and the remaining opaque regions. The photonic crystal layer is then applied, preferably using a transfer process, as with reference to FIG. 5.

The security device illustrated in FIG. 6a exhibits two visually contrasting security characteristics. The device comprises the optical effects of the photonic crystal layer, as described for the previous examples, when the finished substrate is viewed in reflection from the first side (along arrow Y); and a metallic shiny partial coating when viewed from the other side (along arrow X). Additionally clear positive or negative indicia, defined by the black resist, can be seen in transmission from either side. This example is particularly advantageous when used in a device that is viewable from both side of the document in which it is incorporated. For example the device could be incorporated into a secure document using the methods described in EP1141480 or WO03054297.

FIG. 6b illustrates a machine-readable version of the device illustrated in FIG. 6a. The device comprises a metallised PET base layer demetallised with a suitable design including tramlines of metal left along each edge of the device. As described with reference to FIG. 6a a black resist is used during the demetallisation process. A protective layer may be applied onto the metal tramlines (not shown in the figure) to prevent the metal from being corroded by the magnetic layer, which is applied next. A suitable protective layer is VHL31534 supplied by Sun Chemical applied with coat weight of 2 gsm. The protective layer may optionally be pigmented. The magnetic material is only applied over the metal tramlines so as not to obscure the demetallised indicia. The photonic crystal layer is then applied, preferably using a transfer process, as with reference to FIG. 5. An adhesive layer may be applied to the outer surfaces of the device to improve adherence to the security document.

When a magnetic material is incorporated into the device either within the absorbing layer or as a separate layer the magnetic material can be applied in any design but common examples include the use of magnetic tramlines or the use of magnetic blocks to form a coded structure. Suitable magnetic materials include iron oxide pigments ($Fe_2O_3$ or $Fe_3O_4$), barium or strontium ferrites, iron, nickel, cobalt and alloys of these. In this context the term "alloy" includes materials such as Nickel:Cobalt, Iron:Aluminium:Nickel:Cobalt and the like. Flake Nickel materials can be used; in addition Iron flake materials are suitable. Typical nickel flakes have lateral dimensions in the range 5-50 microns and a thickness less than 2 microns. Typical iron flakes have lateral dimensions in the range 10-30 microns and a thickness less than 2 microns.

In an alternative machine-readable embodiment a transparent magnetic layer can be incorporated at any position within the device structure. Suitable transparent magnetic layers containing a distribution of particles of a magnetic material of a size and distributed in a concentration at which the magnetic layer remains transparent are described in WO-A-03091953 and WO-A-03091952.

In a further example the security device of the current invention may be incorporated in a security document such that the device is incorporated in a transparent region of the document. The security document may have a substrate formed from any conventional material including paper and polymer. Techniques are known in the art for forming transparent regions in each of these types of substrate. For example, WO8300659 describes a polymer banknote formed from a transparent substrate comprising an opacifying coating on both sides of the substrate. The opacifying coating is omitted in localised regions on both sides of the substrate to form a transparent region.

EP1141480 describes a method of making a transparent region in a paper substrate. Other methods for forming transparent regions in paper substrates are described in EP0723501, EP0724519 and WO03054297.

Figure 7:
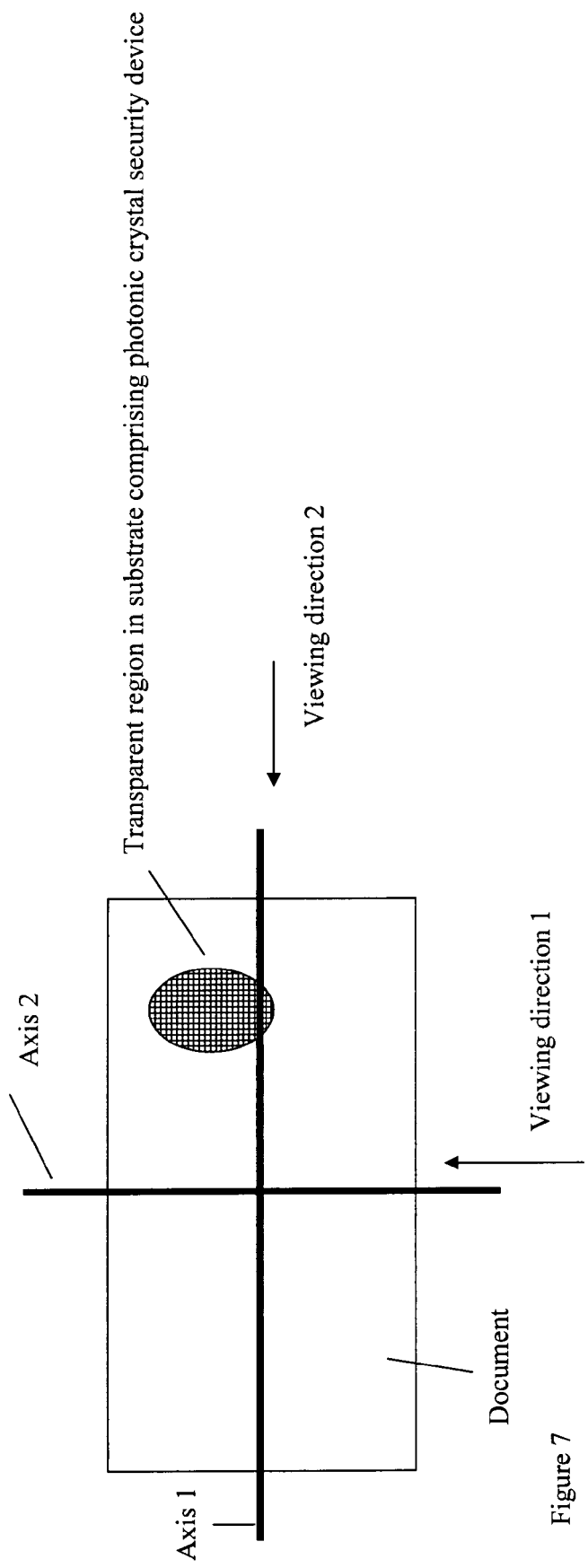
FIG. 7 shows the incorporation of a security device according to a seventh example within a transparent region.
Figure 8A:
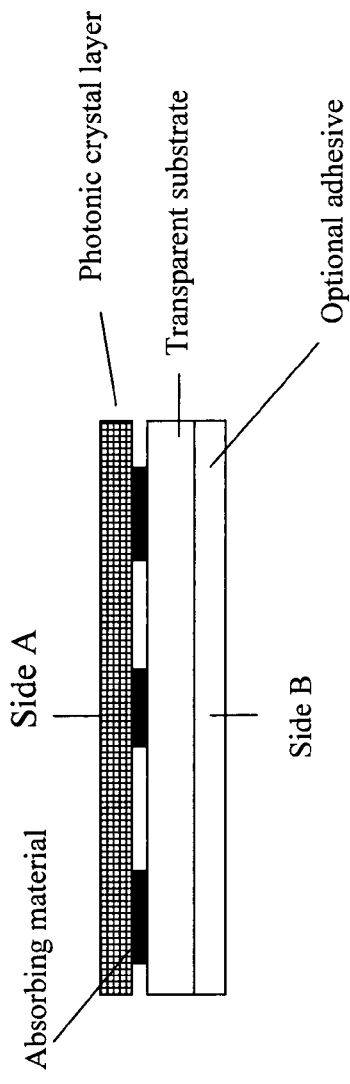
FIG. 8a shows a security device in accordance with an eighth example.

FIG. 7 shows the security device of the current invention incorporated into a transparent region of a security document. FIG. 8a shows a cross-sectional view of the security device within the transparent region. The security device comprises a transparent carrier layer, which preferably forms the transparent region of the substrate. An absorbing material is applied to the transparent layer in localised regions to form a recognisable pattern or identifying image. A layer comprising a photonic crystal material, exhibiting the same optical characteristics as the photonic crystal material in FIGS. 3 and 4, is located above the absorbing layer.

When the device in FIG. 7 is viewed in reflection from side A, a highly contrasting different colour shift effect is observed in two different directions, from the regions of the photonic crystal layer located above the absorbing layer, as the device is tilted. For example in viewing direction 1 (FIG. 7) the colourshift can be from red, when viewed at one angle of incidence to the plane of substrate, to green when viewed at a more oblique angle of incidence to the plane of the substrate. In viewing direction 2 a different colourshift will apply, over the same angular range, for example green to blue. In the regions not above the absorbing layer the transmitted colour saturates the reflective colour. The transmitted and reflected colours are complementary, for example, a red to green colourshift in reflection is seen as a cyan to magenta colourshift in transmission.

Figure 8B:
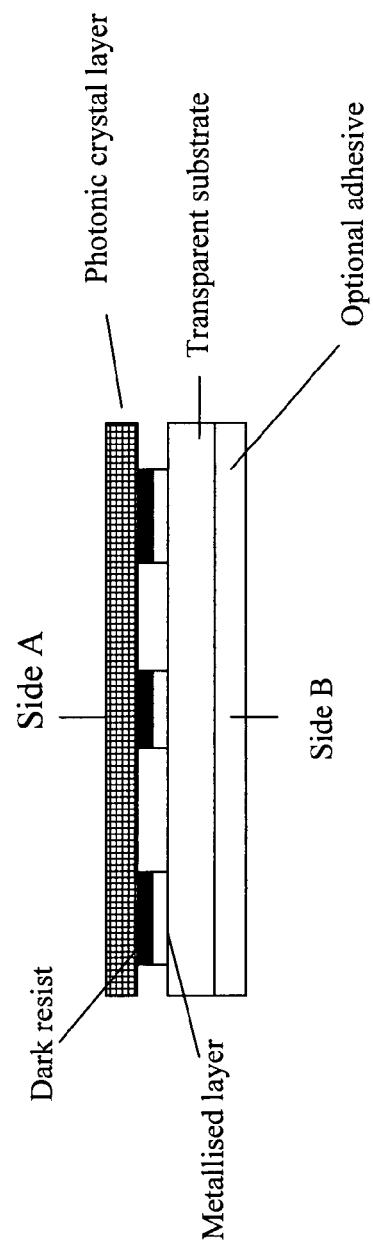
FIG. 8b shows a machine-readable ninth example as an alternative of the eighth example.

When the device in FIG. 8a is viewed in reflection or transmission from side B the dark absorbing layer will be visible in the form of an identifying image. If a dark image is not aesthetically acceptable then a more aesthetically pleasing material/colour could be used to conceal the dark resist such that it is not viewable from side B. For example the dark absorbing areas could be overprinted on side B of the transparent region with differently coloured opaque inks or metallic inks. Alternatively the transparent carrier substrate could be replaced with a metallised polymeric substrate, as illustrated in FIG. 8b. The metallised substrate is printed with a dark resist, as discussed in reference to FIG. 6, in the form of the identifying image. The printed metallised film is then partially demetallised removing the metal in the regions not printed with the resist. When viewing from side A the photonic crystal film is viewed against the absorbing dark resist and appears as described with reference to FIG. 8a, but when viewing from side B a metallic image is observed of the identifying image printed with the dark resist. The image could be positive, i.e. defined by the metallic regions, or negative, i.e. defined by the transparent regions between the metallic regions.

In an alternative machine-readable construction the dark resist in FIG. 8b can be formed using a magnetic pigment, for example magnetite to provide a machine-readable code. In a further embodiment, only part of the dark resist is provided with a magnetic pigment and the remainder is provided with a non-magnetic pigment. If both the magnetic and non-magnetic regions are substantially totally absorbing there will be no visual difference in the photonic crystal film over the two regions and therefore the format of the code will not be readily apparent.

Figure 9A:
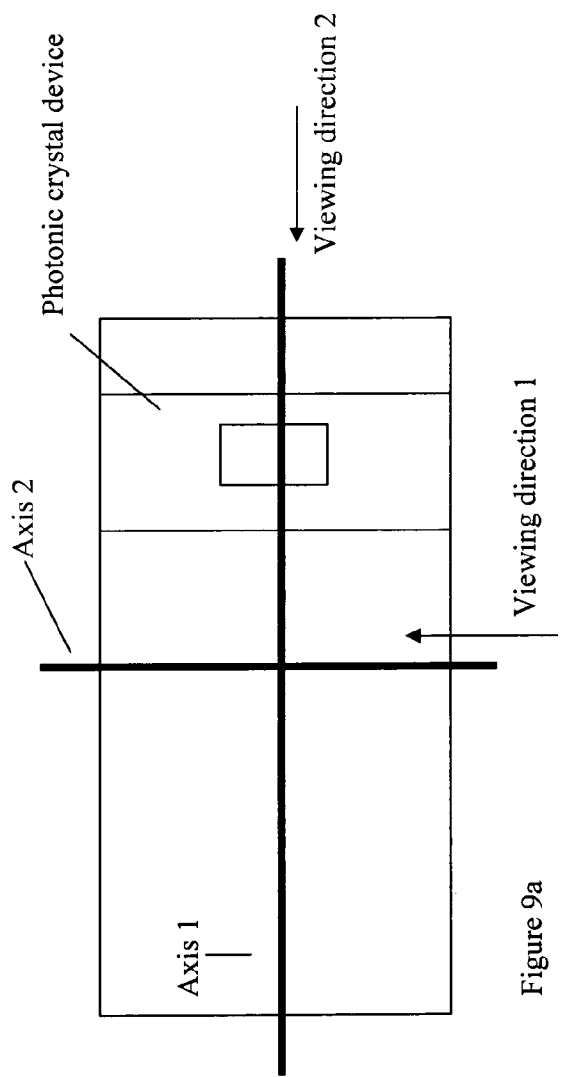
FIG. 9a shows a front side view of a security device partially embedded within a paper substrate.
Figure 9B:
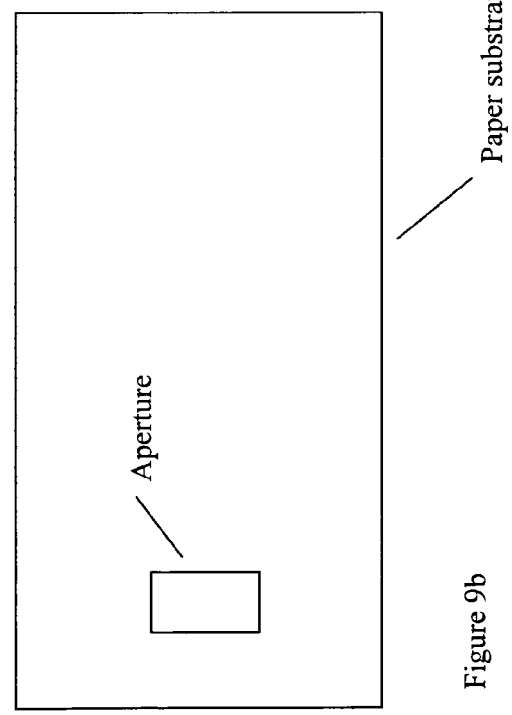
FIG. 9b shows a corresponding rear side view.

FIG. 9 illustrates an example where the security device of the current invention is incorporated into an aperture of a paper substrate. A self-supporting photonic crystal film is incorporated into a paper substrate as described in EP1141480. One side of the photonic crystal film is wholly exposed on the front surface of a paper substrate in which it is partially embedded (FIG. 9a), and partially exposed in one aperture on the rear surface of the substrate (FIG. 9b). In this example carbon nanoparticles have been incorporated into the photonic crystal structure.

On viewing the device from the front of the document in reflection, illustrated in FIG. 9a, and viewing along the viewing direction 1, a highly contrasting colourshift is observed along the whole of the exposed elongate security device. In this example the colourshift is from red, when viewed at one angle incidence to the plane of substrate, for example 70°, to green when viewed at a more oblique angle of incidence, for example 45°, to the plane of the substrate. On rotating the device and viewing along viewing direction 2 a different colour is observed compared to viewing along viewing direction 1 for a given angle of incidence. For example at an angle of 70° to the plane of the substrate the substrate appears green in viewing direction 2 compared to red in viewing direction 1. On tilting to a more oblique angle of incidence, for e.g. 45°, the colour of the device shifts from green to blue in viewing direction 2 compared to red to green in viewing direction 1. The incorporation of the nanoparticles produces a single layer, i.e. non-laminate, strongly coloured substantially opaque film.

This is an advantage over liquid crystal colourshifting films where the use of a separate black or dark absorbing layer is required to generate a strongly coloured substantially opaque film. If a liquid crystal based device is used in the example shown in FIG. 9a then in order for the reflective colourshifting effect to be visible from both sides of the document two liquid crystal films would be required with an absorbing layer between them. In contrast for the current invention the use of the self-supporting photonic crystal film doped with carbon nanoparticles enables the reflective colourshifting effect to be visible from both sides of the document while using just a single layer of colourshifting material. On viewing the device from the rear of the document in reflection, illustrated in FIG. 9b, the same rotationally dependent optical properties, as is observed from the front of the document, is present where the photonic crystal film is exposed in the aperture.

In an alternative embodiment to that referenced in FIGS. 9a and 9b the photonic crystal film can be supported by a carrier layer to facilitate its incorporation into the paper document. The photonic crystal layer may be formed directly onto the carrier substrate as a coated film or formed as a separate film and then laminated to the carrier substrate. The carrier substrate may comprise additional security features including de-metallised designs, holographic designs in combination with a highly reflective layer such as a metallic layer or a thin transparent layer of a high refractive index material (for example ZnS), printed indicia, luminescent or magnetic materials, and coarse embossing with a security design that may be either blind embossed to produce a tactile/visible feature or could include printing inks to further enhance visibility. In this manner a different security feature can be observed on either side of the security device.

In a further embodiment the security device of current invention can be constructed such that different colourshifting effects are observed on either surface of the security device. This can be achieved by laminating together two photonic crystal films with different optical characteristics or by varying the optical characteristics of the photonic crystal film over the thickness of the film.

Figure 10:
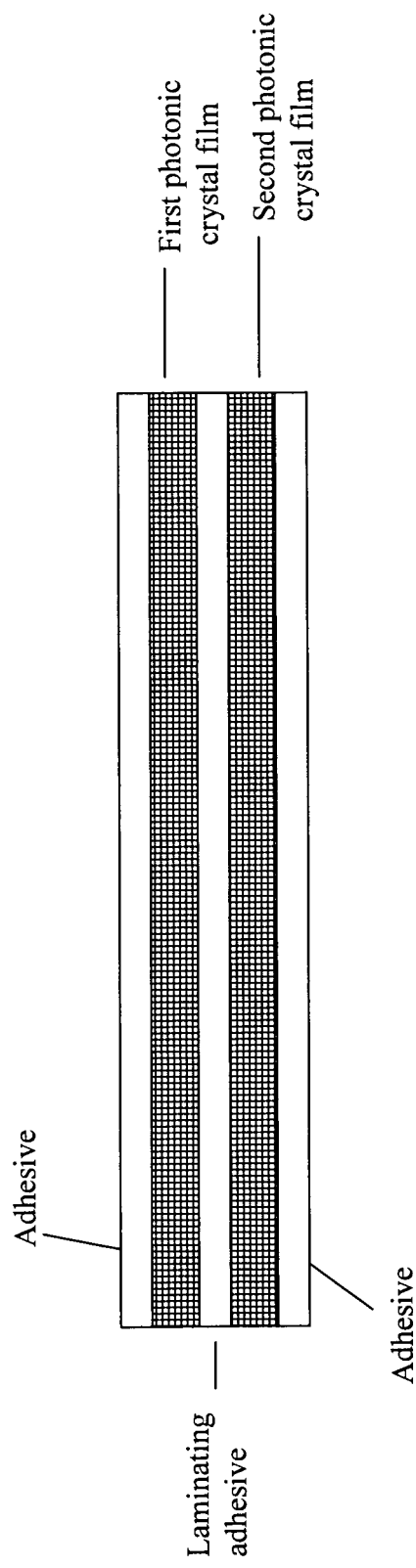
FIG. 10 shows a cross-section of a tenth example security device comprising two photonic crystals.

For example two photonic crystal films can be made from the same materials for the spheres and matrix but differ in their optical properties due to a difference in sphere size. FIG. 10 shows a cross-section of a security device comprising two photonic crystal films adhered together with a laminating adhesive. The laminating adhesive comprises a dark dye or pigment such that it also acts as an absorbing layer. The device can be made machine-readable by incorporating a magnetic pigment into the laminating adhesive or applying an additional magnetic layer to the inner surface of one or both of the photonic crystal films. An adhesive layer may be applied to the outer surfaces of the device to improve adherence to the secure document. The security device is incorporated into a document such that in at least localised regions it is exposed on both surfaces of the secure document. In this example the first photonic crystal film exhibits two different colourshifts when viewed along viewing direction 1 and 2 respectively (not shown in FIG. 10). Viewing direction 1 is parallel to a short side of the document and viewing direction 2 is parallel to a long side of the document. When viewed along viewing direction 1 the device appears red when viewed at an angle of 70° to the plane of the substrate and shifts to green at a more oblique angle of incidence, for example 45°. In contrast when viewed along viewing direction 2 the device exhibits an orange to blue colourshift when tilted through the same angular range. The second photonic crystal film appears yellow when viewed in reflected light along viewing direction 1 at an angle of 70° to the plane of the substrate and shifts to indigo at a more oblique angle of incidence, for example 45°. In contrast when viewed along viewing direction 2 the device exhibits a green to violet colourshift when tilted through the same angular range.

Different colourshifting effects on either surface of the security device can also be generated using a single layer of photonic crystal film by locally varying the optical characteristics of the photonic crystal film over the thickness of the film. For example the sphere size can be varied through the thickness of the film. This variation can be introduced by controlling the assembly of the spheres during the formation of the photonic crystal film. Alternatively if the film is manufactured by polymer extrusion then two polymer mixes, comprising the spheres and the matrix, can be generated with different sphere sizes. The two polymer mixes can then be co-extruded into a single polymer film forming a crystal structure where there is a step change in sphere size at an interface in the centre of the film.

The security device of the current invention may be further customised in order to increase the difficulty in counterfeiting and/or provide identifying information. The customisation process can take place before or after the device is incorporated into the document. In one example the customisation of the security device occurs by applying printed information to the photonic crystal film. The photonic crystal film may be printed with images using any of the conventional printing processes such as intaglio, gravure, ink jet, offset lithography, screen, dye diffusion and flexography. The print may be applied as a single print working in a single colour or as multiple print workings in multiple colours.

In a preferred embodiment the images are printed partly on the photonic crystal film and partly on the substrate the device is incorporated into such that the design continues uninterrupted between the two surfaces. In a further embodiment, one of the colours of the printed images matches one of the switching colours of the photonic crystal film. For example if the photonic crystal film switches from red to green on tilting the device in a specific viewing direction then any red printed information will be substantially invisible at certain angles of incidence but becomes visible as the sample is tilted and the static red of the printed information contrasts with the green of the optically variable photonic crystal film. In this manner a latent image security feature can be created.

Figure 11:
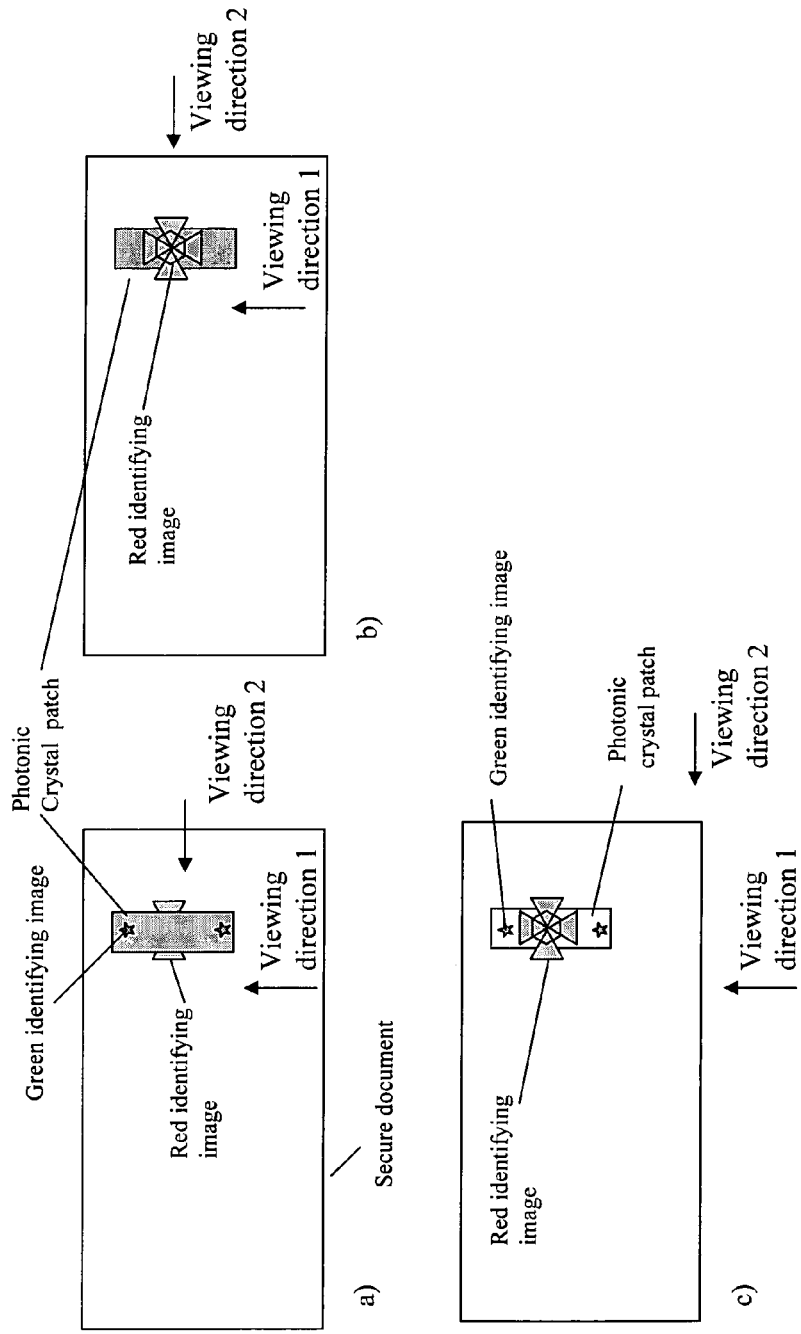

FIG. 11 illustrates another example of the present invention where a security device has been incorporated into the document as a surface applied patch. A red identifying image is printed such that a part is on the substrate and another part is on the security device. On viewing the substrate along viewing direction 1 at an angle of approximately 70° to the plane of the substrate (FIG. 11a) the security device appears red and saturates the printed information on the security device such that only the printed information on the substrate is visible. The printed information is revealed by either tilting or rotating the substrate. On tilting the substrate to a more oblique angle of incidence, while viewing along viewing direction 1, the photonic crystal switches from red to green. On rotating the substrate and viewing along viewing direction 2, but maintaining the same angle of incidence, the photonic crystal also switches from red to green. In both cases the red printed information will be revealed on the security device and a complete image will be formed with the printed information on the substrate (FIG. 11b). If the device is tilted while viewing along viewing direction 2, over the same angular range as for viewing direction 1, the photonic crystal film switches from green to blue and the red identifying image remains visible. A second green identifying image may also be printed on the security device. The green image will be visible along viewing direction 1 when the angle of incidence is approximately 70° to the plane of the substrate but will disappear as the device is tilted and the photonic crystal switches from red to green (FIG. 11b). In contrast the green image will be substantially invisible along viewing direction 2 when the angle of incidence is approximately 70° to the plane of the substrate but will appear as the device is tilted to a more oblique angle and the photonic crystal film switches from green to blue (FIG. 11c).

The security device in the example of FIGS. 11a, 11b, 11c has a number of secure aspects; firstly different colourshifts on tilting with different viewing directions, and secondly the presence of two latent images which are switched on and off alternately by tilting in one viewing direction but can be both switched on simultaneously by tilting in a second viewing direction.

As an alternative to the printing of ordinary coloured inks, it is also possible to print functional inks. By functional inks we mean inks that react to an external stimulus. Inks of this type include but are not limited to fluorescent, phosphorescent, infrared absorbing, thermochromic, photochromic, magnetic, electrochromic, conductive and piezochromic.

As well as functional inks, it is also possible to print onto the photonic crystal film with other optical effect inks. Optical effect inks include OVI® and Oasis® marketed by Sicpa. Other optical inks include inks containing iridescent, iriodine, pearlescent, liquid crystal and metal-based pigments.

In a further embodiment, the customisation of the security device occurs by embossing the photonic crystal film with raised line structures. The embossing of raised line structures into photonic crystal films is particularly advantageous because the facets generated by the embossing result in a change in the angle of incidence of the incoming light, generating facets of differing colours due to the fact that the colour of the photonic crystal film is dependent on the angle of view. The use of a raised line structure with an photonic crystal film has two secure aspects; firstly the optically variable feature generated by the line structure and secondly the creation of localised regions exhibiting different colourshifts from the background film.

For example if the photonic crystal device exhibits a green to blue colourshift on tilting the device away from normal incidence then when viewed at normal incidence the embossed and non-embossed regions will appear green. On tilting the device the non-embossed and embossed regions will change from green to blue at different angles of view as the device is tilted.

A further advantage of using embossed raised line structures is that the structures have a raised surface that can be identified by touch. The smooth surface of the photonic crystal film further enhances the tactility of these raised structures.

The embossed line structures can take any convenient form including straight (rectilinear) or curved such as full or partial arcs of a circle or sections of a sinusoidal wave. The lines may be continuous or discontinuous and, for example, formed of dashes, dots or other shapes. By other shapes we mean the dots or dashes could have a graphical form. The line widths are typically in the range 10-500 microns, preferably 50-300 microns. Preferably, the individual lines are barely visible to the naked eye, the main visual impression being given by an array of multiple lines. The lines can define any shape or form, for example square, triangle, hexagon, star, flower or indicia such as a letter or number.

The embossed line structures are preferably formed by applying an embossing plate to the photonic crystal film under heat and pressure. Preferably the embossing process takes place during the intaglio printing process and is carried out using an intaglio plate having recesses defining the line structures. Preferably the photonic crystal film is blind embossed, i.e. the recesses are not filled with ink. However it is also possible that some of the recesses defining the embossed structure may be filled with ink and others left unfilled. Further intaglio printing or blind embossing may be carried out on regions of the substrate adjacent to the security device using the same intaglio plate so as to achieve precise registration between the different regions.

FIG. 12 shows an example of a security substrate comprising a security device of the current invention where the photonic crystal films has been customised by embossing the film after it has been applied to the base substrate. In this example the elastic photonic crystal film has been incorporated into a paper substrate in the same manner as referenced in FIGS. 9a, 9b and described in EP1141480. FIG. 12 shows the front surface of the paper substrate on which the device is wholly exposed. The device is also exposed on the back surface in the aperture region. In this example the photonic crystal film exhibits a red-green colourshift on tilting the device to an oblique angle of incidence and viewing along viewing direction 1 and a green blue colourshift on tilting the device to an oblique angle of incidence and viewing along viewing direction 2. The embossed line structures, formed by a respective set of substantially parallel raised lines, define the numeral "5". The embossed regions provide an additional optically variable aspect to the device in addition to the angular dependent and rotationally dependent colourshifts exhibited by the non-embossed structures.

On viewing the substrate along viewing direction 1 at a relatively high angle of incidence, for example 70° to the plane of the substrate (FIG. 11a) the non-embossed regions appear red but the embossed regions appear green due to the dominant reflected light arising from the edges of the raised lines. The difference in colour arises because the effective angle of incidence for light incident on the edge regions is greater than the angle of incidence for light incident on flat non-embossed regions. On tilting the substrate to a more oblique angle of incidence the non-embossed regions switch from red to green and the embossed regions switch from green to blue. If the device is rotated by 90°, such that it is viewed along viewing direction 2 the embossed and non-embossed regions appear substantially the same colour at a given viewing angle because very little light is reflected by the edge of the lines.

In a further embodiment the customization of the security device occurs by embossing the photonic crystal film with a non-diffractive line structure. A non-diffractive line structure is an example of a raised line structure which produces an optically variable effect when the angle of incidence light varies, but in which this effect is not caused by interference or diffraction. Security devices based on non-diffractive line structures are known in the prior art for example WO 9002658 describes a security device in which one or more transitory images are embossed into a reflective surface. WO9820382 discloses a further security device in which a group of elemental areas in which lines extend at different angles from each other form respective image pixels. U.S. Pat. No. 1,996, 539 discloses a decorative device in which a relief structure is formed in a surface and has an optically variable effect. WO2005080089 discloses a security device which has segments defined by line structures in a reflective portion of a substrate, which cause incident light to be reflected non-diffractively as the angle of incidence changes.

In an alternative embodiment the security device further comprises an optically variable device such as a hologram or diffraction grating. These devices are commonly formed as relief structures in a substrate, which is then provided with a reflective coating to enhance the replay of the device. In the current invention the photonic crystal can act as the reflective coating and the relief structure can be embossed directly into the photonic crystal film or into an embossing lacquer applied onto the photonic crystal film. Alternatively localised regions of the device can be provided with a metallised layer and the relief structure subsequently embossed into an embossing lacquer on top of the metallised layer. In this manner the device comprises two laterally spaced regions one exhibiting the colourshifting properties of the photonic crystal film and one exhibiting the optically variable properties of a holographic device. Alternatively the metallic reflective coating can be replaced with a transparent reflection enhancing materials for example a thin layer of a high refractive index material such as ZnS. In this case both the colourshifting properties of the photonic crystal material and the optically variable properties of the holographic device are visible in all areas of the device although the optically variable properties of the holographic device will only be visible at certain angles of view.

In a further embodiment of the invention the security device can be customised by the application of a scattering layer to the photonic crystal film. In a preferred embodiment the scattering layer takes the form of a matt varnish or lacquer. In this context a matt varnish or lacquer is one that reduces the gloss of the photonic crystal film by scattering the light reflected from it. One example of a suitable matt varnish is a suspension of fine particles in an organic resin. The surface particles scatter the light as it passes through the varnish resulting in a matt appearance. A suitable varnish for the present invention is "Hi-Seal O 340" supplied by Hi-Tech Coatings Ltd. In an alternative solution the fine particles can be replaced by organic waxes. As a further alternative, the scattering layer can be generated by embossing a matt structure into the surface of a photonic crystal layer. Suitable embossed matt structures are described in WO9719821. The scattering layer modifies the colourshifting properties of the photonic crystal layer.

The scattering layer modifies the surface of the photonic crystal film such that the reflection is now more diffuse reducing the glare of the photonic crystal film and changing the angular range over which the respective colours of the security device are easily viewable to the authenticator. For example, if the photonic crystal material exhibits a red to green colourshift on tilting the device away from normal incidence then the switch from red to green occurs closer to normal incidence for the region with the scattering layer compared to one without a scattering layer.

A further way of customising the security device is to use two or more different coloured absorbing layers. An example of this embodiment is illustrated in FIGS. 13 and 14. FIG. 13 shows a cross-sectional view of a construction of the security device suitable for application as a surface stripe or patch. The device comprises a carrier substrate, which may be coated with a release layer, onto which is applied a photonic crystal film. A red partially absorbing layer is applied over the photonic crystal film in the form of a design and a second black absorbing layer is applied over all of the partially absorbing layer. An adhesive layer is applied to the black absorbing layer. The device is then transferred to a security document, such as a banknote (FIG. 14). After transfer the carrier strip can be removed, leaving the photonic crystal film exposed or alternatively the carrier layer can be left in place to form an outer protective layer. By selection of appropriate colours for the partially absorbing layer the designs defined by this layer can be visible at certain angles of view and viewing directions and invisible at others. In this example the photonic crystal film transmits all wavelengths except red at normal incidence, and exhibits two different optically variable effects in two different viewing directions as described with reference to the example in FIG. 2. Then, at angles of incidence at which the photonic crystal appears red, the design formed by the red partially absorbing layer is invisible with the device appearing a uniform red colour, but on tilting or rotating the device a different colourshift is observed for the photonic crystal regions with and without the partial absorbing layer and therefore the designs are revealed. The revealing of the design is in addition to the two different optically variable effects observed in the two different viewing directions.

In yet a further embodiment of the present invention, the photonic crystal film can be customised by providing gaps in the film such that in localised regions the underlying layer is visible. The gaps can be provided by transferring or coating the photonic crystal film onto a carrier substrate in a partial manner. Alternatively the gaps can be created at later stage in the process for example by laser ablating a fully formed photonic crystal film. FIG. 15 illustrates a device comprising a carrier substrate over which has been applied a red partial absorbing layer onto which has been transferred a photonic crystal film. A laser is used to form gaps in the photonic crystal film in the form of an identifying image. In this example the photonic crystal film transmits all wavelengths except red at normal incidence, and exhibits two different optically variable effects in two different viewing directions as described with reference to the example in FIG. 2. Then, at angles of incidence at which the photonic crystal appears red, the identifying information defined by exposed red absorbing layer in the gaps is not distinguishable from the background. On tilting or rotating the device the photonic crystal film switches from red to green but the gaps which expose the underlying absorbing layer still appear red, In this manner the identifying image is made to a appear by tilting or rotating the device. The revealing of the identifying image is in addition to the two different optically variable effects observed in the two different viewing directions.

FIG. 16 illustrates a further example where there are gaps present in the photonic crystal film. The device in FIG. 16 comprises a photonic crystal film which has been transferred onto a substantially transparent carrier substrate. Alternatively a self-supporting photonic crystal film can be used without the need for a carrier substrate. The photonic crystal film is the same as that described in relation to FIGS. 9a, 9b and carbon nanoparticles have been incorporated into the photonic crystal structure to produce a substantially opaque film with an intense red colour when viewed at normal incidence. A laser is used to form gaps in the photonic crystal film in the form of an identifying image. The identifying image is clearly visible from both sides, especially in transmitted light due to the contrast between the regions of the substantially opaque photonic crystal film which have been removed and the remaining opaque regions. The security device illustrated in FIG. 16 exhibits two visually contrasting security characteristics; firstly the optical effects of the photonic crystal layer and secondly the identifying image clearly visible in transmission from either side of the device.

In yet a further embodiment of the present invention, photonic crystal materials can be selected such that at certain angles of view and in specified viewing directions the reflected light is in the non-visible wavelengths of the electromagnetic spectrum. The use of photonic crystals where only one component of the colourshift is in the visible region of the electromagnetic spectrum enables an image to be incorporated into the device that only becomes apparent at certain angles of view in specified viewing directions.

FIG. 17 shows a cross-sectional view of a further embodiment of the security device of the current invention. The device is intended for use as a security label and comprises a photonic crystal film onto which is printed identifying indicia using inks or dyes. The photonic crystal film has been doped with carbon nanoparticles to generate an intense opaque colour. An adhesive layer is applied to one side of the device and over this is applied a glassine carrier layer. The glassine layer allows the label to be easily removed for reapplication to a document, or other item requiring protection.

FIG. 18 shows the label device applied to a substrate. The glassine layer is first removed to expose the adhesive layer. The label device is then applied to the substrate; the adhesive used may be a pressure sensitive or hot melt adhesive and may be permanent or temporary. The use of temporary adhesives can be of use where a label needs to be removed and reapplied to another article. However, it is more likely that the label must be applied in a permanent manner. To prevent removal and reapplication of a permanently applied label the label may also be provided with other tamper evident features e.g. frangible substrate layers, kiss cuts, and the like.

In the example in FIG. 18 the photonic crystal film when viewed from a first viewing direction, for example parallel to the short side of the substrate, appears blue at a relatively high angle of incidence, for example 70° to the plane of the substrate. The identifying indicia is printed in a blue colour such that when the device is viewed at this relatively high angle of incidence in the first viewing direction the indicia is not readily apparent against the background colour of the photonic crystal film. On tilting the device and viewing in the first viewing direction the photonic crystal film changes from blue to invisible ultra violet light and the film will appear black due to the presence of the carbon nanoparticles. As the device is tilted the blue printed identifying indicia is revealed as the background changes from blue to black.

On rotating the security device and viewing it at a relatively high angle of incidence along the second viewing direction, i.e. parallel to the long side of the substrate, the device will appear green with the blue identifying indicia being visible against the green background. On tilting the device and viewing in the second viewing direction the photonic crystal film changes from green to blue. As the device is tilted, and viewed along the second viewing direction the blue printed identifying indicia disappears into the blue background of the photonic crystal film. In this manner a security feature is achieved such that when viewed along one side of the document an identifying image appears on tilting but when rotated and viewed along a perpendicular side the same identifying image is seen to disappear on tilting.

In a modification to the example of FIGS. 17 and 18, illustrated in FIGS. 19 and 20, the photonic crystal film comprises a photonic crystal that in one viewing direction solely reflects infrared light when viewed at a relatively high angle of incidence, and reflects visible light when tilted to a more oblique angle of incidence. FIG. 19 is a cross-section of a security device and comprises a polymeric carrier substrate onto which is printed a dark absorbing layer. A photonic crystal film is then transferred onto the absorbing layer and is overprinted with a red identifying image. In this example the photonic crystal is not doped with carbon nanoparticles but the presence of the absorbing layer means that only the reflected wavelengths of light are seen as a colour. An adhesive layer is applied to one side of the device and over this is applied a glassine carrier layer.

FIG. 20 illustrates a plan view of the device. In the example in FIG. 20 the photonic crystal film when viewed from viewing direction 1 at a relatively high angle of incidence, for example 70° to the plane of the substrate, appears colourless and therefore the device will take on the black appearance of the underlying absorbing layer. The identifying indicia are printed in a red colour such that when the device is viewed at this relatively high angle of incidence in the first viewing direction the indicia are readily apparent against the black colour of the absorbing layer (FIG. 20a). On tilting the device and viewing in the first viewing direction the photonic crystal film changes from invisible infra-red light to visible red light and the red identifying indicia will disappear against the red background generated by the photonic crystal film (FIG. 20b). On rotating the security device and viewing it at a relatively high angle of incidence along viewing direction 2 the device will appear red such that the red identifying indicia is substantially indistinguishable against the red of the photonic crystal film (FIG. 20b). On tilting the device and viewing in viewing direction 2 the photonic crystal film changes from red to green and the red identifying indicia becomes readily apparent against the green background (FIG. 20c).

In this manner a security feature is achieved such that when viewed along one side of the document an identifying image appears on tilting but when rotated and viewed along a perpendicular side the same identifying image is seen to disappear on tilting. In this manner a highly interactive security feature is created which is both striking and memorable to the authenticator.

In a further embodiment of the current invention the photonic crystal material is selected such that when the device is subject to an external stimulus an additional optical effect is observed. The optical effect in each case may produce a non-optically variable effect, such as reflection of the incident light at all wavelengths. The external stimulus may take a number of forms either alone or in combination, these including mechanical, thermal, chemical, electrical, magnetic, electromagnetic or ultrasonic stimuli.

The optical effect may produce a non-optically variable effect, such as reflection of the incident light at all wavelengths. Typically however, the optical effect generated is an optically variable effect.

The difference between the optical response of the crystal in the presence and absence of the external stimulus is preferably of sufficient magnitude to be detectable visually by a human observer and/or is machine-readable.

The stimulus causes a modification in the periodic spacing of one or more refractive entities within the crystal structure. In one embodiment the modification is the direct result of deformation due to an applied stress, but in alternative embodiments there is no direct mechanical deformation and the modification is induced indirectly for example in the case of a thermal, chemical, electrical, magnetic, electromagnetic or ultrasonic stimulus.

In some cases, the stimulus causes a modification in the refractive index of one or more refractive entities within the crystal structure. For example, one or more of the entities within the crystal structure may exhibit electro-optical, magneto-optical or chemical effects wherein the change in the crystal structure is primarily one relating to a refractive index rather than spacing of the various entities from which the crystal structure is comprised. In chemical terms, this might for example result from the uptake of water. However a combination of this with mechanical modification of the periodic spacing within the crystal is also envisaged.

The photonic crystal may be selected such that the effect of the stimulus upon the crystal is reversible upon removal of the stimulus or upon application of an opposite stimulus. The crystal lattice spacing can therefore be reversibly modified, for example contracted or expanded, in some cases elastically, by applying an external stimulus.

One preferred example is reversibly modifying the photonic crystal lattice spacing by mechanically bending, stretching, poking or pressing the material. In this context poking is differentiated from pressing due to the fact that the area being deformed is not back supported during the deformation. As a result of the deformation the characteristics of the full or partial photonic band gap that derive from the periodicity of the photonic crystal lattice are altered, and hence the reflective and transmissive properties can be engineered to respond to a mechanical stimulus. In this case the external stimulus will be preferably transferred to the security device by the authenticator pressing the device. Suitable photonic crystals for use with a stimulus of mechanical deformation are those which have a flexible, elastomeric matrix and are known as elastic photonic crystals.

Elastic photonic crystals typically comprise polymeric materials for both the matrix and the spheres. Typical examples of elastic photonic crystals suitable for the current invention are described in US20040131799, US20050228072, US20040253443 and U.S. Pat. No. 6,337,131. The crystal may be formed from spheres of the first material and a matrix of a second material wherein each material has a different respective refractive index. The matrix therefore may be readily deformable by taking the form of an elastomeric material.

Materials suitable for forming the spheres are preferably single polymer or copolymer materials. Typical examples include both polymers and copolymers of polymerisable unsaturated monomers and polycondensates and copolycondensates of monomers containing at least two reactive groups, such as, for example, high-molecular-weight aliphatic, aliphatic/aromatic or fully aromatic polyesters, polyamides, polycarbonates, polyureas and polyurethanes, but also amino and phenolic resins, such as, for example, melamine-formaldehyde, urea-formaldehyde and phenol-formaldehyde condensates, are suitable.

Materials suitable for forming an elastomeric matrix are addition polymers having a low glass transition temperature. Examples include addition polymers and copolymers of polymerizable unsaturated monomers and also of the polycondensates and copolycondensates of monomers having two or more reactive groups, e.g., high molecular weight aliphatic, aliphatic-aromatic or wholly aromatic polyesters and polyamides, but also of the amino and phenolic resins, such as melamine-formaldehyde, urea-formaldehyde and phenol-formaldehyde condensates.

Non-polymeric materials are also envisaged for the spheres and the matrix and they may be inorganic or metallic or a hybrid composite.

FIG. 21 illustrates an example where an elastic photonic crystal is used in the security device of the current invention. A self-supporting elastic photonic crystal film is incorporated into a paper substrate as described in EP1141480. One side of the photonic crystal film is wholly exposed on the front surface of a paper substrate in which it is partially embedded (FIG. 21a), and partially exposed in one aperture on the rear surface of the substrate (FIG. 21b). In this example carbon nanoparticles have been incorporated into the photonic crystal structure such that the film has an intense red colour when viewed at normal incidence.

On viewing the device from the front of the document in reflection, illustrated in FIG. 21a, and viewing along viewing direction 1 a highly contrasting colourshift effect is observed along the whole of the exposed elongate security device. In this example the colourshift is from red, when viewed at one angle incidence to the plane of substrate, for example 70°, to green when viewed at a more oblique angle of incidence, for example 45°, to the plane of the substrate. On rotating the device and viewing along viewing direction 2 a different colour is observed compared to viewing along viewing direction 1 for a given angle of incidence. For example at an angle of 70° to the plane of the substrate the substrate appears green in viewing direction 2 compared to red in viewing direction 1. On tilting to a more oblique angle of incidence, for e.g. 45°, the colour of the device shifts from green to blue in viewing direction 2 compared to red to green in viewing direction 1.

In this example a mechanical external stimulus is applied by bending the document around its central longitudinal axis, as illustrated in FIG. 21*c*. This deformation modifies the photonic band structure of the crystal and hence the wavelength and spatial dependence of the reflectivity observed by the authenticator. In this example the deformation causes a contraction of the lattice perpendicular to the plane of the substrate that results in the observed colour moving to a shorter wavelength for example red goes to green and green goes to blue. In the current example the aperture is positioned such that it falls within the central axis of the document such that when the authenticator bends the document around the central axis the maximum deformation and hence colour change occurs in the aperture region of the document. An advantage of the current invention is that on deforming the elastic photonic crystal a dynamic colour change is observed.

In the example in FIGS. 21*a*, 21*b*, 21*c*, as the device is bent around the central aperture the initial colour change, when viewed along viewing direction 1, from red to green is in the central region of the aperture where the deformation is the highest, as the document is bent further the deformation increases outwards towards the edges of the aperture and a green band is observed to move towards the edge of the aperture. If the document is bent to a sufficiently high radius of curvature the central region of the aperture will switch from green to blue. An angular dependent colourshift will also be observed when the device is in its deformed state for example this could be from green to blue as the substrate is tilted in its initial deformed state and viewed along viewing direction 1. On removal of the deformation the photonic crystal layer will revert to its original colour and therefore the authentication process is reversible. The change in colour with deformation provides a further interactive component to the security device which is both memorable to the public and difficult to counterfeit.

In all of the examples the designs or identifying images created by any of the layers, for example the photonic crystal film, the absorbing or customising layers, can take any form. Preferably the designs are in the form of images such as patterns, symbols and alphanumeric characters and combinations thereof. The designs can be defined by patterns comprising solid or discontinuous regions which may include for example line patterns, fine filigree line patterns, dot structures and geometric patterns. Possible characters include those from non-Roman scripts of which examples include but are not limited to, Chinese, Japanese, Sanskrit and Arabic.

The invention claimed is:

1. An optically variable security device comprising a photonic crystal,
    wherein the photonic crystal is provided as a self-supporting film or the photonic crystal is supported by a substrate or carrier layer,
    wherein the photonic crystal is configured to receive incident light and to selectively reflect or transmit the incident light to generate a first optically variable effect observable over a first set of directions and to selectively reflect or transmit the incident light to generate an optical effect observable over a second set of directions that is different from the first set of directions,
    wherein the first and second sets of directions lie in substantially different planes which intersect to define the normal to a crystal surface, and
    wherein the first optically variable effect observable over the first set of directions is different from the optical effect observable over the second set of directions.

2. The optically variable security device according to claim 1, wherein the photonic crystal has a full or partial band gap which does not have rotational symmetry about the normal to its surface.

3. The optically variable security device according to claim 1, wherein the optical effect observable over the second set of directions is a second optically variable effect.

4. The optically variable security device according to claim 3, wherein the optically variable security device is arranged such that each of the first optically variable effect and the second optically variable effect are visible to a naked eye of a human observer.

5. The optically variable security device according to claim 3, wherein each of the first optically variable effect and the second optically variable effect is in the infra-red or ultra-violet part of the electromagnetic spectrum.

6. The optically variable security device according to claim 5, wherein the first optically variable effect is a first angularly dependent colour effect and the second optically variable effect is a second angularly dependent colour effect, that is different from the first angularly dependent colour effect.

7. The optically variable security device according to claim 3, wherein, when the optically variable security device is illuminated with a white light source, the first and second optically variable effects are colour effects.

8. The optically variable security device according to claim 3, wherein the first optically variable effect and the second optically variable effect are reflective effects.

9. The optically variable security device according to claim 1, comprising a photonic crystal in which the first optically variable effect and the optical effect are dependent upon an orientation of the photonic crystal with respect to the incident light.

10. The optically variable security device according to claim 3, wherein each of the first optically variable effect and the optical effect is a function of the viewing angle with respect to the photonic crystal.

11. The optically variable security device according to claim 1, wherein the photonic crystal comprises a quasi-crystal.

12. The optically variable security device according to claim 1, wherein the incident light is one or more of, ultra violet, visible or infrared light.

13. The optically variable security device according to claim 1, wherein the photonic crystal is formed from spheres of a first material and a matrix of a second material, where each of the first material and the second material having a different respective refractive index.

14. The optically variable security device according to claim 1, wherein the photonic crystal has structural parameters that are different at different positions within the photonic crystal so as to produce different corresponding optical properties.

15. The optically variable security device according to claim 1, wherein the photonic crystal is formed from two or more crystal structures having different optically variable properties.

16. The optically variable security device according to claim 1, wherein the photonic crystal is provided as a self-supporting film.

17. The optically variable security device according to claim 1, wherein the photonic crystal is supported by a substrate or carrier layer.

18. The optically variable security device according to claim 17, wherein the substrate or carrier layer is a polymeric layer.

19. The optically variable security device according to claim 1, wherein the optically variable security device is provided with an adhesive layer upon an outer surface thereof.

20. The optically variable security device according to claim 1, further comprising a scattering layer.

21. The optically variable security device according to claim 1, further comprising an optically absorbent material provided as one or more layers applied to the optically variable security device.

22. The optically variable security device according to claim 21, wherein the optically absorbent material is selectively absorbent at light wavelengths.

23. The optically variable security device according to claim 21, wherein the optically absorbent material is an ink or dye.

24. The optically variable security device according to claim 1, wherein the optically variable security device further comprises a metallised layer.

25. The optically variable security device according to claim 24, wherein the metallised layer is selectively demetallised at a number of locations.

26. The optically variable security device according to claim 24, wherein the optically variable security device further comprises a layer of resist upon the metallised layer.

27. The optically variable security device according to claim 24, wherein the said metallised layer or the layer of resist is arranged as indicia.

28. The optically variable security device according to claim 1, wherein the optically variable security device is arranged to be machine-readable.

29. The optically variable security device according to claim 28, wherein the optically variable security device comprises at least one layer of machine-readable material or the photonic crystal further comprises machine-readable material.

30. The optically variable security device according to claim 29, wherein the machine-readable material is a magnetic material.

31. The optically variable security device according to claim 29, wherein the at least one layer of machine-readable material is transparent.

32. The optically variable security device according to claim 28, wherein the optically variable security device further comprises a separate layer containing machine-readable material.

33. The optically variable security device according to claim 28, wherein the machine-readable material comprises a material which is responsive to an external stimulus.

34. The optically variable security device according to claim 1, further comprising an optically absorbent material formed within a crystal structure of the photonic crystal.

35. The optically variable security device according to claim 1, further comprising nanoparticles within a crystal structure of the photonic crystal.

36. The optically variable security device according to claim 35, wherein the photonic crystal further comprises nanoparticles distributed uniformly through the photonic crystal such that each part of the photonic crystal exhibits the same optical effect.

37. The optically variable security device according to claim 35, wherein the photonic crystal further comprises nanoparticles distributed in homogeneously through the photonic crystal such that different parts of the photonic crystal exhibit a different optical effect.

38. The optically-variable security device according to claim 37, wherein the nanoparticles are distributed according to a concentration gradient.

39. The optically variable security device according to claim 37, wherein the nanoparticles are distributed in a number of regions having different concentrations.

40. The optically variable security device according to claim 35, wherein the nanoparticles are carbon nanoparticles.

41. The optically variable security device according to claim 1, wherein the optically variable security device is arranged to produce a latent image which is selectively visible according to the viewing angle.

42. The optically variable security device according to claim 1, wherein a surface of the photonic crystal is embossed with raised structures.

43. The optically variable security device according to claim 1, wherein a surface of the optically variable security device is overprinted.

44. The optically variable security device according to claim 1, wherein the optically variable security device further comprises a hologram.

45. The optically variable security device according to claim 1, wherein the photonic crystal is provided as a polymeric film.

46. A security document comprising an optically variable security device according to claim 1, wherein the optically variable security device is adhered to or contained within the security document.

47. The security document according to claim 46, wherein the optically variable security device is embedded within a document window so as to provide crystal surfaces for receiving incident light on each of opposing faces of the document.

48. The security document according to claim 46, wherein the security device is provided in a form selected from the group consisting of a security thread, a security fibre, a security patch, a security strip, a security strip, and security foil.

49. The security document according to claim 46, wherein the optically variable security device is overlaid upon, applied to or forms part of an additional security feature.

50. The security document according to claim 46, wherein the optically variable security device is supported upon a transparent layer.

51. The security document according to claim 46, wherein the security document is a bank note.

* * * * *